(12) United States Patent
DeVaul

(10) Patent No.: US 9,321,517 B1
(45) Date of Patent: Apr. 26, 2016

(54) METHODS AND SYSTEMS FOR ALTITUDE CONTROL OF BALLOONS TO IMPROVE WIND DATA

(71) Applicant: Google Inc., Mountain View, CA (US)

(72) Inventor: Richard Wayne DeVaul, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/472,364

(22) Filed: Aug. 28, 2014

Related U.S. Application Data

(60) Provisional application No. 61/884,825, filed on Sep. 30, 2013.

(51) Int. Cl.
*G05D 1/00* (2006.01)
*B64B 1/40* (2006.01)
*G01W 1/10* (2006.01)
*G01W 1/00* (2006.01)

(52) U.S. Cl.
CPC .. *B64B 1/40* (2013.01); *G01W 1/10* (2013.01); *G01W 2001/003* (2013.01)

(58) Field of Classification Search
CPC ....................................................... G01C 23/00
See application file for complete search history.

(56) References Cited

U.S. PATENT DOCUMENTS

| | | | |
|---|---|---|---|
| 6,628,941 | B2 | 9/2003 | Knoblach et al. |
| 8,290,696 | B1 | 10/2012 | Sridhar et al. |
| 2012/0232785 | A1 | 9/2012 | Wiesemann et al. |
| 2013/0175391 | A1 | 7/2013 | DeVaul et al. |

OTHER PUBLICATIONS

Mueller, Joseph, Guidance, Navigation and Control of High-Altitude Airships, Princeton Satellite Systems, Inc., 2006.

*Primary Examiner* — Michael D Lang
(74) *Attorney, Agent, or Firm* — McDonnell Boehnen Hulbert & Berghoff LLP

(57) ABSTRACT

A method may involve analyzing, by a computing device, a wind model to identify one or more locations in a coverage area of a balloon network where updated wind data is desirable. The balloon network may include a plurality of balloons that are configured to provide data service. The method may further involve determining, by the computing device, a flight plan for each of one or more balloons in the balloon network. At least one flight plan may be determined based at least in part on both: (a) the one or more locations where updated wind data is desirable and (b) data-service requirements in the coverage area of the balloon network. And the method may involve sending each determined flight plan for implementation by the corresponding balloon.

22 Claims, 9 Drawing Sheets

METHODS AND SYSTEMS FOR ALTITUDE CONTROL OF BALLOONS TO IMPROVE WIND DATA

CROSS-REFERENCE TO RELATED APPLICATION

The present application claims the benefit of U.S. Provisional Application No. 61/884,825, filed Sep. 30, 2013. The entire disclosure contents of this application are herewith incorporated by reference into the present application.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Methods and systems for altitude control of balloons to improve wind data are disclosed herein. Beneficially, embodiments described herein may improve the accuracy of planning movement of one or more balloons, which may in turn (i) conserve energy of at least one balloon of the one or more balloons and (ii) allow at least one balloon of the one or more balloons to find winds that will carry it to a desired horizontal location more quickly. For instance, embodiments described herein may improve the accuracy of planning movement of the one or more balloons by using updated wind data to plan movement of the one or more balloons.

In one aspect, a method involves analyzing, by a computing device, a wind model to identify one or more locations in a coverage area of a balloon network where updated wind data is desirable, wherein the balloon network comprises a plurality of balloons that are configured to provide data service; determining, by the computing device, a flight plan for each of one or more balloons in the balloon network, wherein at least one flight plan is determined based at least in part on both: (a) the one or more locations where updated wind data is desirable and (b) data-service requirements in the coverage area of the balloon network; and sending each determined flight plan for implementation by the corresponding balloon.

In another aspect, a method involves determining, by a computing device, a flight plan for each of one or more balloons, wherein the one or more balloons are operating as part of a balloon network, wherein the balloon network is operable for data communications, and wherein determining the flight plan for at least one of the one or more balloons comprises determining a planned altitude based at least in part on a wind model indicating predicted wind data at a plurality of altitudes; sending, by the computing device, one or more instructions to the one or more balloons for which a flight plan is determined to implement the respectively-determined flight plan, wherein the one or more instructions to a given one of the balloons indicate to: navigate to one or more altitudes, wherein the one or more altitudes is less or greater than the planned altitude; and receive wind data at each altitude of the one or more altitudes, wherein the wind data indicates an actual wind condition at a respective altitude of the one or more altitudes; receiving, by the computing device, the wind data from at least one balloon of the one or more balloons for which a flight plan is implemented; and updating, by the computing device, the wind model based at least in part on the received wind data.

In another aspect, a non-transitory computer readable medium having stored therein instructions executable by a computing device to cause the computing device to perform functions, the functions includes: determining a flight plan for each of one or more balloons, wherein the one or more balloons are operating as part of a balloon network, wherein the balloon network is operable for data communications, and wherein determining the flight plan for at least one of the one or more balloons comprises determining a planned altitude based at least in part on a wind model indicating predicted wind data at a plurality of altitudes; sending one or more instructions to the one or more balloons for which a flight plan is determined to implement the respectively-determined flight plan, wherein the one or more instructions to a given one of the balloons indicate to: navigate to one or more altitudes, wherein the one or more altitudes is less or greater than the planned altitude; and receive wind data at each altitude of the one or more altitudes, wherein the wind data indicates an actual wind condition at a respective altitude of the one or more altitudes; receiving the wind data from at least one balloon of the one or more balloons for which a flight plan is implemented; and updating the wind model based at least in part on the received wind data.

In another aspect, a system includes means for analyzing a wind model to identify one or more locations in a coverage area of a balloon network where updated wind data is desirable, wherein the balloon network comprises a plurality of balloons that are configured to provide data service; means for determining a flight plan for each of one or more balloons in the balloon network, wherein at least one flight plan is determined based at least in part on both: (a) the one or more locations where updated wind data is desirable and (b) data-service requirements in the coverage area of the balloon network; and means for sending each determined flight plan for implementation by the corresponding balloon.

In yet another aspect, a system includes means for determining a flight plan for each of one or more balloons, wherein the one or more balloons are operating as part of a balloon network, wherein the balloon network is operable for data communications, and wherein determining the flight plan for at least one of the one or more balloons comprises determining a planned altitude based at least in part on a wind model indicating predicted wind data at a plurality of altitudes; means for sending one or more instructions to the one or more balloons for which a flight plan is determined to implement the respectively-determined flight plan, wherein the one or more instructions to a given one of the balloons indicate to: navigate to one or more altitudes, wherein the one or more altitudes is less or greater than the planned altitude; and receive wind data at each altitude of the one or more altitudes, wherein the wind data indicates an actual wind condition at a respective altitude of the one or more altitudes; means for receiving the wind data from at least one balloon of the one or more balloons for which a flight plan is implemented; and means for updating the wind model based at least in part on the received wind data.

These as well as other aspects, advantages, and alternatives, will become apparent to those of ordinary skill in the art by reading the following detailed description, with reference where appropriate to the accompanying drawings.

DETAILED DESCRIPTION

Figure 1:
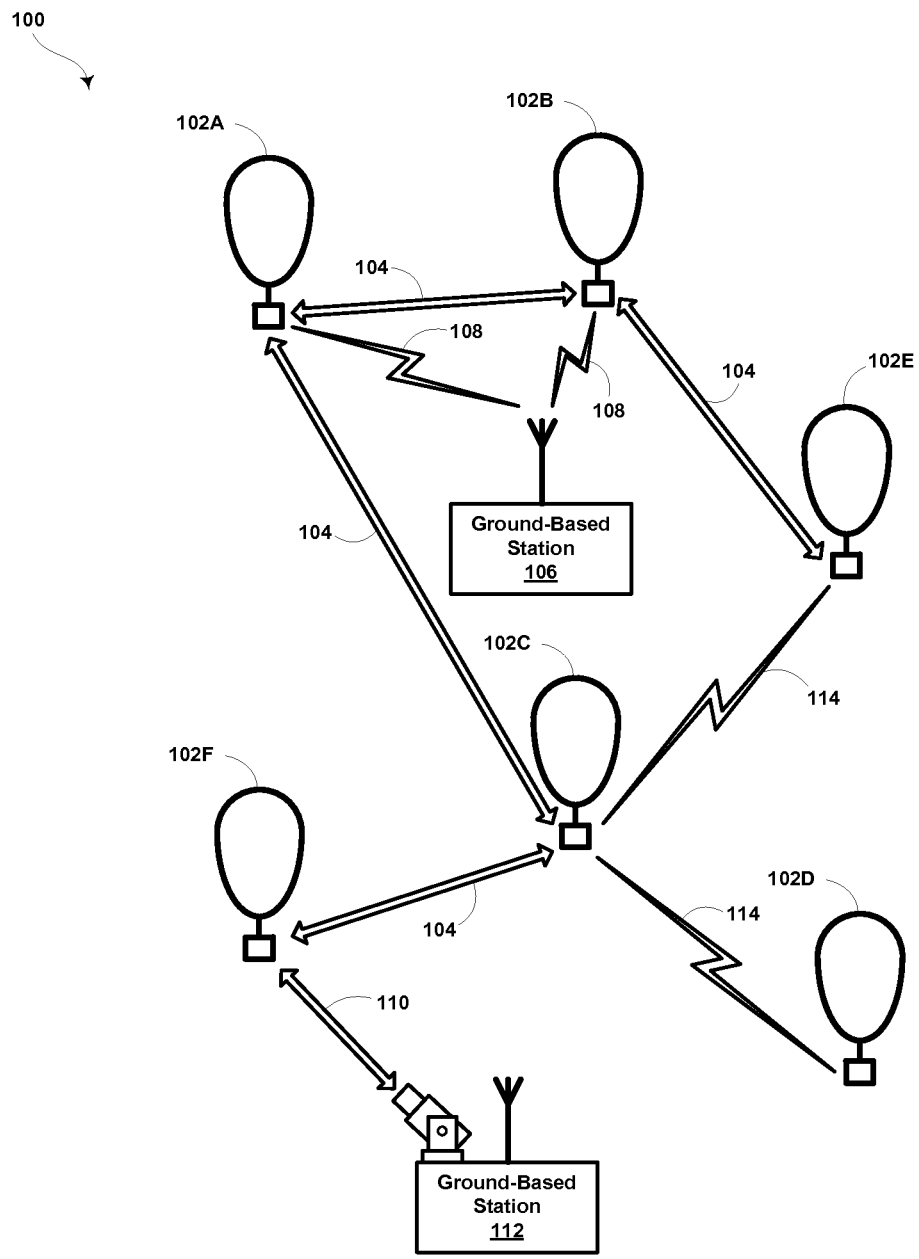
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed apparatus can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Illustrative embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able to find winds that will carry it horizontally (e.g., latitudinally and/or longitudinally) to a desired horizontal location.

Further, in an example balloon network, the balloons may communicate with one another using free-space optical communications. For example, balloon-to-balloon free-space optical links may be implemented using lasers. As another example, balloons may be configured for optical communications using ultra-bright LEDs (which are also referred to as "high-power" or "high-output" LEDs). In addition, the balloons may communicate with ground-based station(s) using radio-frequency (RF) communications.

In an illustrative configuration, a fleet planner, which may be implemented in a balloon or a ground-based station, may use a wind model to determine flight plans for a number of different balloons in order to achieve a desired topology. The wind model could be a predictive wind model, such as a model from the National Oceanic and Atmospheric Administration that indicates wind patterns that are expected in the future. In some implementations, a predictive wind model may include predicted wind data that indicates a predicted wind condition (e.g., predicted wind speed and/or predicted wind direction) at a plurality of altitudes. In addition, the wind model could additionally or alternatively be based on wind patterns that are actually observed by balloons in the balloon network. Such wind data may be generated by the balloons, and may indicate actual wind conditions (e.g., wind speed and/or wind direction) at a plurality of altitudes.

In some implementations, the fleet planner could build and/or maintain such a wind model or contribute to building and/or maintaining such a wind model. To do so, the fleet planner may aggregate actual wind data from the balloons in the balloon network, and use such data to build up and/or modify a wind model that has been built from past wind data provided by the balloons, or to modify a predictive wind model. Further, the fleet planner may use wind data that is received from the balloons to update a model that is based on a combination of predicted wind data and previous wind conditions observed by the balloons.

In the context of a balloon network, embodiments described herein may help to update wind models and/or flight plans. Beneficially, updating a wind model may improve the accuracy of fleet planning. Moreover, updating a flight plan may (i) conserve energy of a balloon and (ii) allow the balloon to find winds that will carry it to a desired horizontal location more quickly. For example, updating the flight plan may conserve energy of the balloon by reducing altitude changes while navigating to the desired horizontal location, which may in turn reduce changes in thermal loads on the balloon.

II. Balloon Data Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured to communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of this disclosure.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical switching involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100. The term "substantially the same," as used in this disclosure refers to exactly the same and/or one or more deviations from exactly the same that do not significantly impact altitude control of balloons to improve wind data as described herein.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
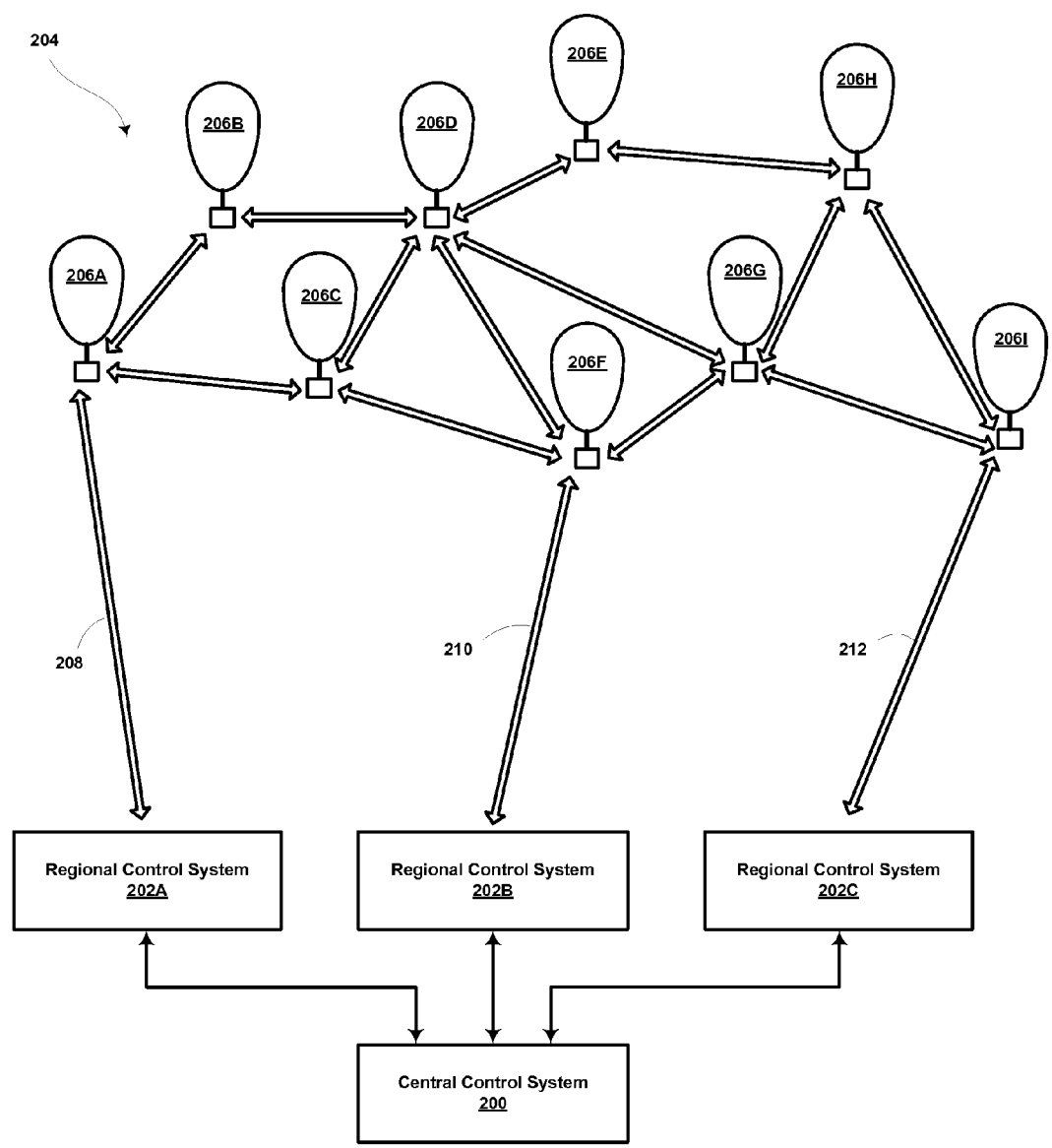
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG.

2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 208, 210, and 212, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use predicted wind data and/or wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_j$, wherein $d_j$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

III. Illustrative Balloon Configurations

Figure 3:
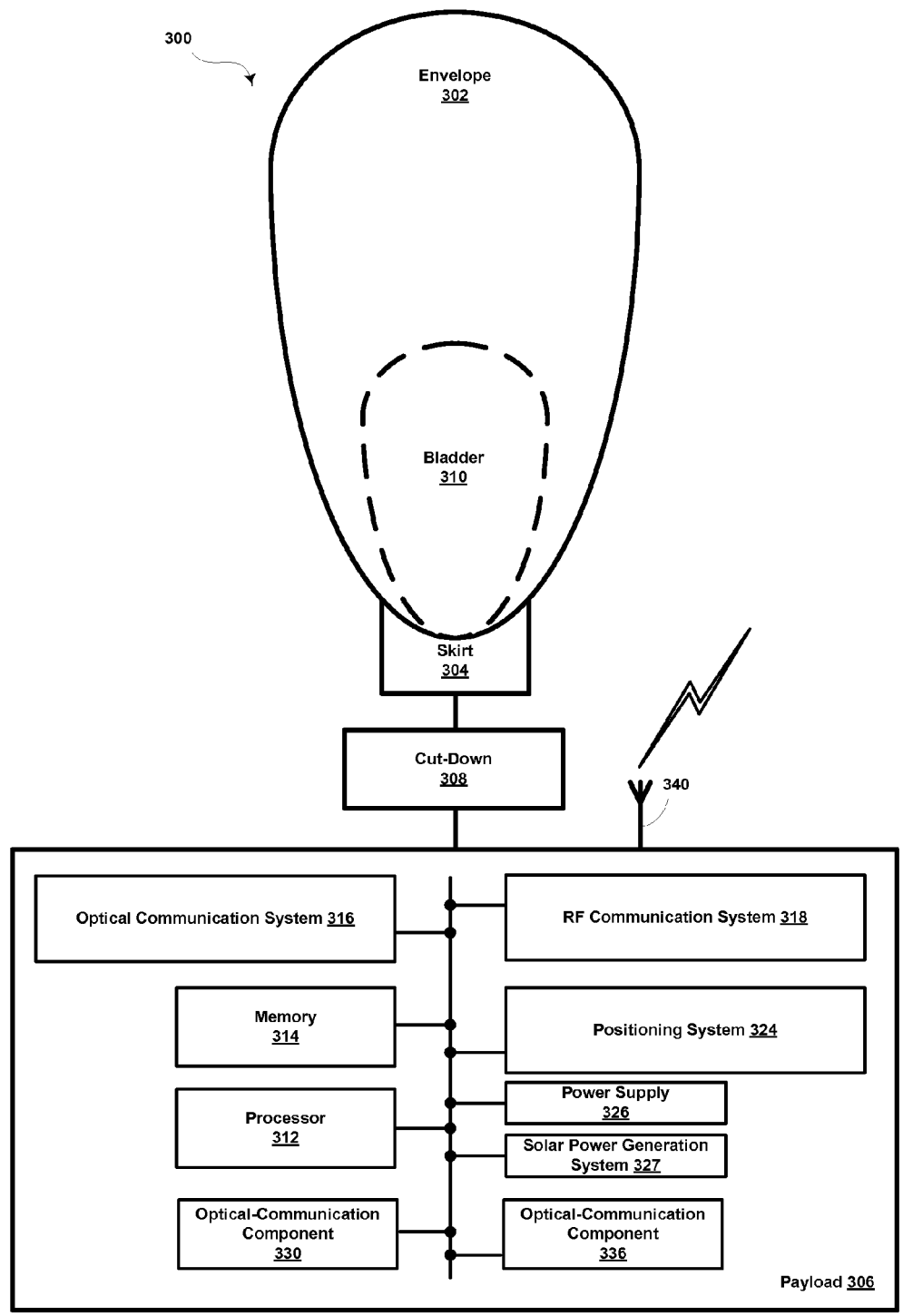
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The memory 314 may have instructions stored thereon, which can be accessed and executed by the processor 312 in order to carry out the balloon functions described herein. Further, the processor 312, in conjunction with program instructions stored in memory 314, and/or other components, may function as a control system of balloon.

The payload 306 of balloon 300 may also include various other types of equipment and systems to provide a number of different functions. For example, the payload 306 may also include an optical communication system 316, which may control transmission and/or reception of optical signals to and/or from other balloons. Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be an element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use predicted wind data and/or wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

As noted, balloon 300 may include an optical communication system 316 for free-space optical communication with other balloons. As such, optical communication system 316 may be configured to transmit a free-space optical signal by modulating a laser or ultra-bright LED system. The optical communication system 316 may be implemented with mechanical systems and/or with hardware, firmware, and/or software. Generally, the manner in which an optical communication system is implemented may vary, depending upon the particular application.

In the illustrated example, optical communication system 316 is configured to operate optical-communication components 330 and 336. Within the context of this disclosure, the optical-communication components 330 and 336 may include an optical transmitter, an optical receiver, and/or an optical transceiver.

Note that the location of optical-communication components on the payload 306, optical-communication components 330 and 336, may vary. Further, various different electronic and/or mechanical systems, such as one or more gimble mounts, may be used to position optical-communication components by e.g., changing a pointing direction and/or changing a location of an optical-communication component on the payload 306.

Further, optical-communication component 330 may be configured to maintain an optical link with a first neighboring balloon while optical-communication component 336 may be configured to maintain an optical link with a second neighboring balloon or a ground-based station. In other words, one or more optical-communication components could be used with respective pointing mechanisms in an effort to maintain optical links with one or more ground-, air-, or space-based network nodes.

IV. Altitude Control of Balloons to Improve Wind Data

A. Identifying Locations where Updated Wind Data is Desirable

Figure 4:
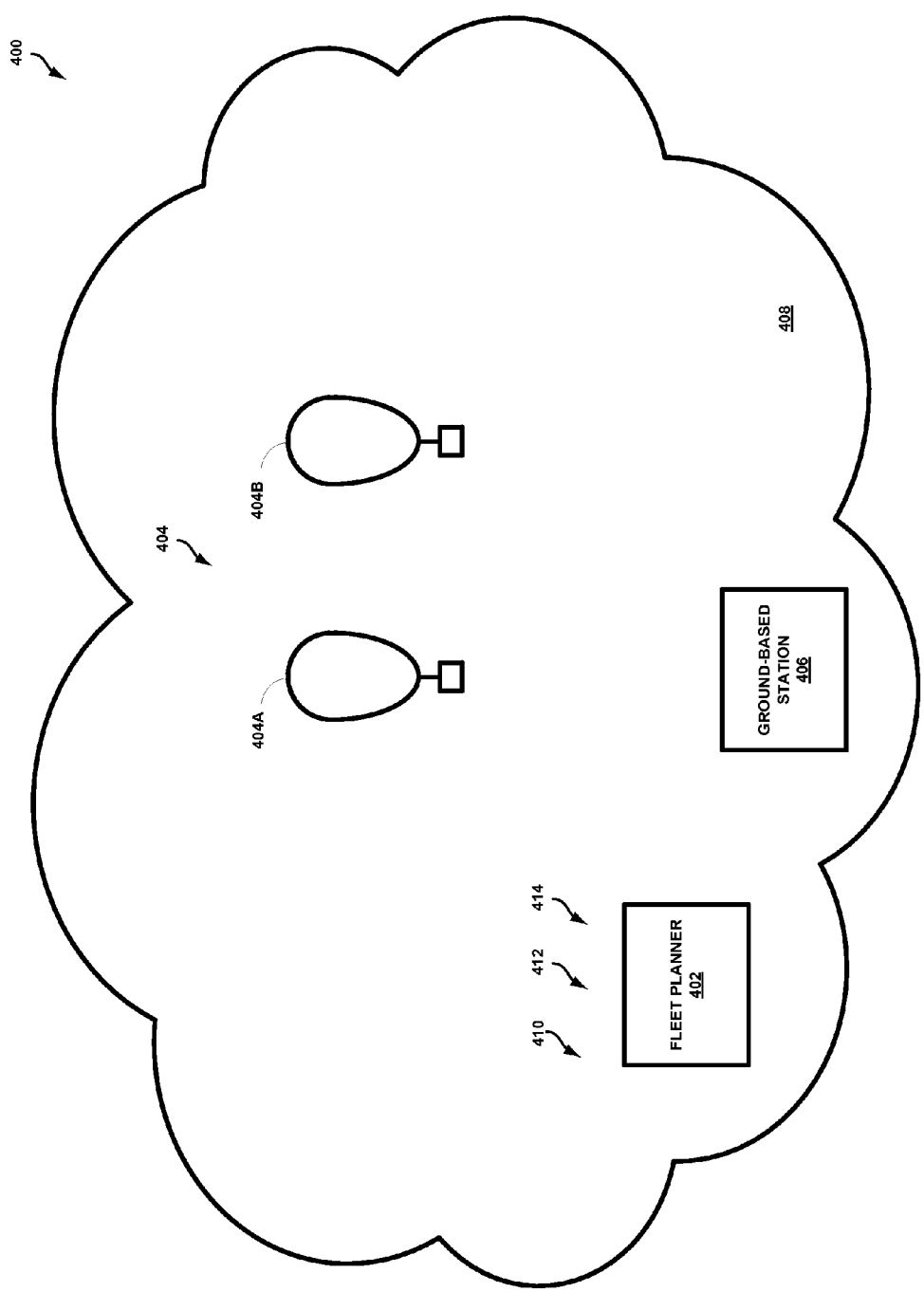
FIG. 4 illustrates an example of identifying locations where updated wind data is desirable, according to an example embodiment.

FIG. 4 depicts an example 400 of identifying locations where updated wind data is desirable, according to an example embodiment. As shown in FIG. 4, example 400 includes a fleet planner 402, a balloon network 404 operable for data communications, and a ground-based station 406. The balloon network may be configured to provide data service to a coverage area 408. The balloon network 404 may take the form of or be similar in form to the balloon network 100 and/or the balloon network 204. Moreover, the ground-based station 406 may take the form of or be similar in form to the ground-based station 106, the ground-based station 112, the central control system 200, the regional control system 202A, the regional control system 202B, and/or the regional control system 202C.

The balloon network 404 may include one or more balloons (or a plurality of balloons). In the illustrated example, the balloon network 404 includes two balloons: a first balloon 404A and a second balloon 404B. However, in other examples, the balloon network 404 may include less than two balloons or more than two balloons. The first balloon 404A and/or the second balloon 404B may take the form of or be similar in form to any of the balloons described herein, such as the balloon 300.

Example 400 is generally described as being carried out by the fleet planner 402. The fleet planner 402 may be configured to control operation(s) of the first balloon 404A and its components and/or the second balloon 404B and its components. In some embodiments, the fleet planner 402 may be configured to perform one or more functions described herein.

The fleet planner 402 may be implemented with mechanical systems and/or with hardware, firmware, and/or software. As one example, the fleet planner 402 may take the form of program instructions stored on a non-transitory computer readable medium and a processor that executes the instructions. The fleet planner 402 may be implemented in whole or in part on the first balloon 404A, the second balloon 404B, and/or at least one entity remotely located from the first balloon 404A and the second balloon 404B, such as the ground-station 406 and/or a spaced-based platform (not shown). Generally, the manner in which the fleet planner 402 is implemented may vary, depending upon the particular application.

For illustrative purposes, example 400 is described in a series of actions as shown in FIG. 4, though example 400 could be carried out in any number of actions and/or combinations of actions. Example 400 begins at point 410 with analyzing a wind model to identify one or more locations in the coverage area 408 of the balloon network 404 where updated wind data is desirable. In some implementations, the wind model may take the form of or be similar in form to any of the wind models described herein. Further, in some implementations, updated wind data may be desirable at one or more locations where existing wind data at the one or more locations (locally and/or globally) is inadequate and/or out of date. As examples, existing wind data at the one or more locations may be inadequate when the existing wind data is incomplete or inaccurate. And, as another example, existing wind data at the one or more locations may be out of date when the existing data indicates wind conditions that occurred at time period before point 410. The time period could be any number of seconds, minutes, hours, days, weeks, etc.

The fleet planner 402 may analyze the wind model to identify the one or more locations in the coverage area 408 of the balloon network 404 where updated wind data is desirable in various different ways in various different embodiments. For example, in some embodiments, the fleet planner 402 may analyze the wind model in a predetermined order to identify the one or more locations in the coverage area 408 of the balloon network 404 where updated wind data is desirable.

The predetermined order could be based on various different parameters. As one example, the predetermined order may be based on a position of each location of the one or more locations in the coverage area 408 of the balloon network 404. With this arrangement, the fleet planner 402 may analyze the wind model in a geographic sequence or pattern (e.g., from east locations to west locations, from north locations to south locations, and the like) to identify the one or more locations in the coverage area 408 of the balloon network 404 where updated wind data may be desirable. As another example, the predetermined order may be based on locations where balloons in the network are distributed more densely. With this arrangement, the fleet planner 402 may analyze the wind model in a balloon-density sequence (e.g., from more dense locations to less dense locations, from less dense locations to more dense locations, and the like).

Example 400 continues at point 412 with determining a flight plan for each of one or more balloons in the balloon network 404. For example, the fleet planner 402 may determine a flight plan for the first balloon 404A and a flight plan for the second balloon 404B. In some implementations, the flight plan for the first balloon 404A may include a planned movement for the first balloon or a planned latitude, longitude, and/or altitude for the first balloon 404A. The planned movement may be based on one or more of: a desired displacement, a desired horizontal movement, a desired change in altitude, a desired velocity, a desired change in velocity, and a desired acceleration. With this arrangement, the flight plan for the first balloon 404A may help to achieve a desired topology for the balloon network 404.

Further, in some implementations, the flight plan for the second balloon 404B may include a planned movement for the second balloon 404B or a planned latitude, longitude, and/or altitude for the second balloon 404B. The planned movement may be based on one or more of: a desired displacement, a desired horizontal movement, a desired change in altitude, a desired velocity, a desired change in velocity, and a desired acceleration. With this arrangement, the flight plan for the second balloon 404B may help to achieve a desired topology for the balloon network 404.

Further still, in some implementations, the flight plan may be determined based at least in part on both: (a) the one or more locations where updated wind data is desirable and (b) data-service requirements in the coverage area 408 of the balloon network 404. With this arrangement, the flight plan for the first balloon 404A and/or the flight plan for the second balloon 404A may differ from what they might be if they were only based on the data-service requirements in the coverage area 408 of the balloon network 404.

Example 400 continues at point 414 with sending each determined flight plan for implementation by the corresponding balloon. In some implementations, the fleet planner 402 may send the determined flight plan for first balloon 404A to the first balloon 404A and the determined flight plan for second balloon 404A to second balloon 404A.

The fleet planner 402 may send each determined flight plan for implementation by the corresponding balloon through a variety of techniques. For example, the fleet planner 402 may send the determined flight plan for first balloon 404A to the first balloon 404A and the determined flight plan for second balloon 404A to the second balloon 404A using any or all of the communication techniques that a balloon may use to communicate with another balloon and/or a ground-based station as described herein. In some examples, the fleet planner 402 may send the determined flight plan for first balloon 404A to the first balloon 404A the same or similar way as the fleet planner 402 may send the determined flight plan for second balloon 404A to the second balloon 404A. However, in other examples, the fleet planner 402 may send the determined flight plan for first balloon 404A to the first balloon 404A in a different way than the fleet planner 402 may send the determined flight plan for second balloon 404A to the second balloon 404A.

Moreover, one or more actions that correspond with points 410-414 may be performed at various different time periods in various different embodiments. For instance, the one or more actions that correspond with point 410 may be performed at a first time period, the one or more actions that correspond with point 412 may be performed at a second time period, and the one or more actions that correspond with point 414 may be performed at a third time period. However, in other examples, at least some of the actions of the one or more that correspond with points 410, 412, and 414 may be performed concurrently.

In some implementations, at point 410 the fleet planner 402 may analyze two or more wind models to identify one or more locations in the coverage area 408 of the balloon network 404 where updated wind data is desirable. And in such implementations, the fleet planner 402 may compare each model of the two or more wind models to identify the one or more locations in the coverage area 408 of the balloon network 404 where updated wind data is desirable. For instance, when the two or more wind models includes a first wind model and a second wind model and the first wind model includes first predicated wind data and the second wind model includes second predicated wind data, the fleet planner 402 may compare the first predicated wind data with the second predicated wind data to identify the one or more locations in the coverage area 408 of the balloon network 404 where updated wind data is desirable.

Further, in some implementations, the balloon network 404 may be configured to provide one or more types of data service in the coverage area 408, such as data-communication service, on-demand imaging service, and location service. In such implementations, the data-service requirements in the coverage area 408 of the balloon network 404 may include particular data-service requirements for each type of data service. For instance, the data-service requirements may include data-service requirements for data-communication service, data-service requirements for on-demand imaging service, and data-service requirements for location service. In some examples, the data-service requirements for data-communication service may be different than the data-service requirements for on-demand imaging service and/or the data-service requirements for location service, and the data-service requirements for on-demand imaging service may be different than the data-service requirements for location service. In an example, the data-service requirements for data-communication, the data-service requirements for on-demand imaging, and the data-service requirements for location service may involve different topologies of the balloon network 404.

With this arrangement, when the balloon network 404 is configured to provide two or more types of data service and each type of data service has data-service requirements, the flight plan for the first balloon 404A and/or the flight plan for the second balloon 404B may be determined based at least in part on both: (a) the one or more locations where updated wind data is desirable and (b) the data-service requirements for some or all of the two or more types of data service. For instance, when the balloon network 404 is configured to provide data-communication service, on-demand imaging service, and location service; and data-communication service has data-service requirements for communication service, on-demand imaging service has data-service requirements for on-demand imaging service, and location service has data-service requirements for location service, the flight plan for the first balloon 404A and/or the flight plan for the second balloon 404B may be determined based at least in part on both (a) the one or more locations where updated wind data is desirable and (b) the data-service requirements for data-communication service, the data-service requirements for on-demand imaging service, and the data-service requirements for location service.

Example 400 may further involve determining data usage of the balloon network 404 and selecting the data-service requirements to use in determining the flight plans based at least in part on the data usage of the balloon network 404. For instance, at point 412, the fleet planner 402 may determine the data usage of the balloon network 404 and select the data-service requirements to use in determining the flight plans based at least in part on the data usage of the balloon network 404. With this arrangement, the fleet planner may prioritize obtaining updated wind data and particular data-service requirements.

As one example, when the balloon network 404 is configured to provide data-communication service, on-demand imaging service, and location service; data-communication service has data-service requirements for communication service, on-demand imaging service has data-service requirements for on-demand imaging service, and location service has data-service requirements for location service; and the fleet planner 402 determines that the data usage of the balloon network 404 is low, the fleet planner 402 may select the data-service requirements for data-communication service, the data-service requirements for on-demand imaging, and the data-service requirements for location service to use in determining the flight plans.

As another example, when the balloon network 404 is configured to provide data-communication service, on-demand imaging service, and location service; data-communication service has data-service requirements for communication service, on-demand imaging service has data-service requirements for on-demand imaging service, and location service has data-service requirements for location service; and the fleet planner 402 determines that the data usage of the balloon network 404 is medium, the fleet planner 402 may select the data-service requirements for data-communication service and the data-service requirements for on-demand imaging to use in determining the flight plans.

As another example, when the balloon network 404 is configured to provide data-communication service, on-demand imaging service, and location service; data-communication service has data-service requirements for communication service, on-demand imaging service has data-service requirements for on-demand imaging service, and location service has data-service requirements for location service; and the fleet planner 402 determines that the data usage of the balloon network 404 is medium, the fleet planner 402 may select the data-service requirements for data-communication service and the data-service requirements for on-demand imaging to use in determining the flight plans.

And as another example, when the balloon network 404 is configured to provide data-communication service, on-demand imaging service, and location service; data-communication service has data-service requirements for communication service, on-demand imaging service has data-service requirements for on-demand imaging service, and location service has data-service requirements for location service; and the fleet planner 402 determines that the data usage of the balloon network 404 is high, the fleet planner 402 may select the data-service requirements for data-communication service to use in determining the flight plans.

B. Updating a Wind Model Based at Least in Part on Received Wind Data

Figure 5:
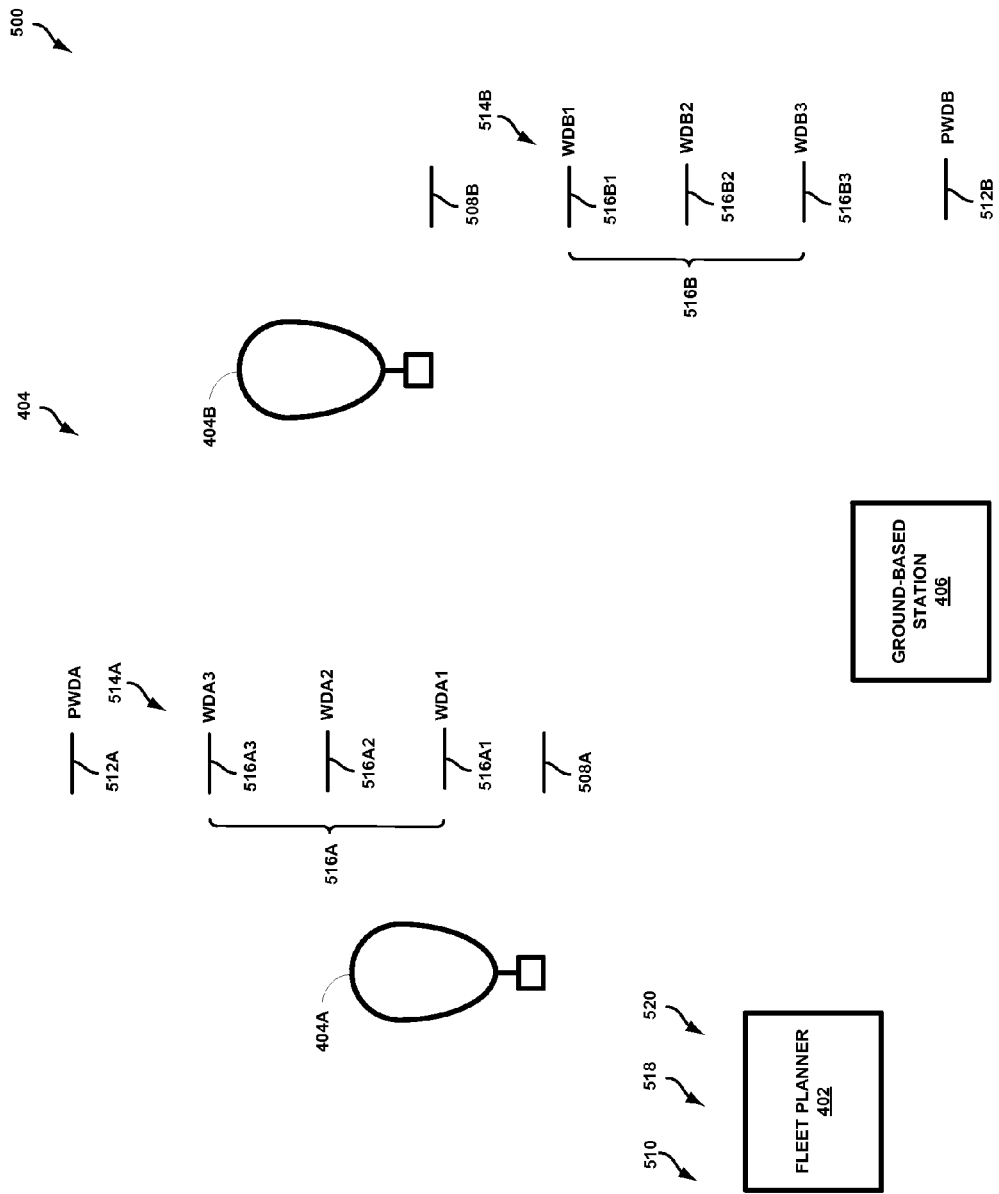
FIG. 5 illustrates an example of updating a wind model based at least in part on received wind data, according to an example embodiment.

FIG. 5 depicts an example 500 of updating a wind model based at least in part on received wind data, according to an example embodiment. As shown in FIG. 5, example 500 includes the fleet planner 402, the balloon network 404, and the ground-based station 406. The balloon network 404 is configured to provide data service in the coverage area 408 (not shown). Example 500 may be carried out in the coverage area 408.

The balloon network 404 includes two balloons: the first balloon 404A and the second balloon 404B. As shown in FIG. 5, the first balloon 404A is located at a first initial altitude 508A and the second balloon 404B is located at a second initial altitude 508B. In the illustrated example, the second initial altitude 508B is greater than the first initial altitude 508A. However, in other examples, the second initial altitude 508B may be less than or equal to the first initial altitude 508A.

Example 500 is generally described as being carried out by the fleet planner 402. For illustrative purposes, example 500 is described in a series of actions as shown in FIG. 5, though example 500 could be carried out in any number of actions and/or combinations of actions. Example 500 begins at point 510 with determining a flight plan for each of the one or more balloons in the balloon network 404. In some embodiments, determining the flight plan for at least one balloon of the balloon network 404 may involve determining a planned altitude based at least in part on a wind model indicating predicted wind data at a plurality of altitudes. In some implementations, the fleet planner 402 may build and/or maintain the wind model or contribute to building and/or maintaining the wind model. The wind model may take the form of or be similar in form to any of the wind models described herein.

In addition, in some examples, determining the flight plan for at least one balloon of the balloon network 404 may involve determining a planned altitude based at least in part on two or more wind models indicating predicated wind data at a plurality of altitudes. And in such examples, the fleet planner 402 may compare each model of the two or more wind models to determine the planned altitude. For instance, when the two or more wind models includes a first wind model and a second wind model and the first wind model includes first predicated wind data and the second wind model includes second predicated wind data, the fleet planner 402 may compare the first predicated wind data with the second predicated wind data to determine the planned altitude.

At point 510, the fleet planner 402 may determine a planned altitude 512A for the first balloon 404A and a planned altitude 512B for the second balloon 504B. In the illustrated example, the planned altitude 512A is greater than the planned altitude 512B. However, in other examples, the planned altitude 512A may be less than or equal to the planned altitude 512B. And as shown in FIG. 5, the planned altitude 512A may include predicted wind data (PWDA), and the planned altitude 512B may include predicted wind data (PWDB). PDWA may indicate a predicted wind condition at the planned altitude 512A, and PDWB may indicate a predicted wind condition at the planned altitude 512B. PWDA and PWDB may be based on a wind model used by the fleet planner 402.

In some embodiments, the fleet planner 402 may determine the planned altitude 512A and/or the planned altitude 512B based at least in part on a movement of the balloon for which the flight plan is determined. The movement of the first balloon 404A and/or the movement of the second balloon 404B may be based on one or more of: a desired displacement, a desired horizontal movement, a desired change in altitude, a desired velocity, a desired change in velocity, and a desired acceleration.

And in some implementations, the movement of the first balloon 404A and/or the movement of second balloon 404B may be based on a state of the network 404, such as data-communication requirements of the network 404. For example, the fleet planner 402 may assess altitudes where predicted wind data indicates that a predicted wind condition may carry at least one balloon of the balloon network 404 to a desired horizontal location. With this arrangement, the planned altitude 512A and/or planned altitude 512B may help to achieve a desired topology for the balloon network 404.

The state of the network 404 may also be based on data-service requirements, such as data-service requirements for data-communication service, data-service requirements for on-demand imaging service, and data-service requirements for location service. In addition, the state of the network 404 may be based on historical and/or expected bandwidth demand. As one example, bandwidth demand may vary during the day and during the night (e.g., bandwidth demand may be lower during the night). As another example, bandwidth demand may increase during a period of time during which a major sporting event or concert is occurring within the coverage area 408. Other examples are also possible.

In some embodiments, the fleet planner 402 may determine the planned altitude 512A and/or the planned altitude 512B based at least in part on acquisition of wind data for the wind model. For example, the fleet planner 402 may assess locations where wind data (locally and/or globally) is inadequate and/or out of date. And the fleet planner 402 may accordingly factor the need for such data in a certain area into the determination of the planned altitude 512A and/or the planned altitude 512B. With this arrangement, the planned altitude 512A and/or the planned altitude 512B may differ from what they might be if they were only based on the movement of the balloon for which the flight is determined.

Further still, in some implementations, the fleet planner 402 may determine the planned altitude 512A and/or the planned altitude 512B based at least in part on both movement of the balloon for which the flight was determined and acquisition of wind data for the wind model. In some examples, the fleet planner 402 may determine the planned altitude 512A the same way, the similar way, or a different way as the fleet planner 402 may determine the planned altitude 512B.

Example 500 continues at a point 514A and a point 514B with sending one or more instructions to the one or more balloons of the balloon network 404 for which a flight plan is determined to implement the respectively-determined flight plan. The one or more instructions to a given balloon may indicate to navigate to one or more altitudes and receive wind data at each altitude of the one or more altitudes. With such an arrangement, first balloon 404A and second balloon 404B may change its altitude in a step-wise manner while receiving wind data at each altitude of the one or more altitudes. In some examples, one or more actions that correspond with point 514A and one or more actions that correspond with point 514B may be performed concurrently.

At point 514A, the fleet planner 402 may send one or more instructions to the first balloon 404A to implement its respectively-determined flight plan, and the one or more instructions may indicate to navigate to first one or more altitudes 516A and receive wind data at each altitude of the first one or more altitudes 516A.

In the illustrated example, the first initial altitude 508A is less than the first one or more altitudes 516A, and the first one or more altitudes 516A is less than the planned altitude 512A. Accordingly, the fleet planner 402 may send one or more instructions to the first balloon 404A to implement its respectively-determined flight plan, and the one or more instructions may indicate to ascend to the first one or more altitudes 516A. However, in other examples, the first initial altitude 508A may be greater than the first one or more altitudes 516A, and the first one or more altitudes 516A may be greater than the planned altitude 512A. And, in other examples, the fleet planner 402 may send one or more instructions to the first balloon 404A to implement its respectively-determined flight plan, and the one or more instructions may indicate to descend to the first one or more altitudes 516A.

The first one or more altitudes 516A may be located at various different distances from the planned altitude 512A in various different embodiments. In some implementations, the fleet planner 402 may determine a distance between the first one or more altitudes 516A and the planned altitude 512A. And in at least one such implementation, the fleet planner 402 may determine the distance between the first one or more altitudes 516A and the planned altitude 512A based at least in part on acquisition of wind data for the wind model. For example, the fleet planner 402 may factor the need for wind data in a certain area into the determination of the distance between the first one or more altitudes 516A and the planned altitude 512A. The fleet planner may determine the distance between the first one or more altitudes 516A and the planned altitude 512A based at least in part on other factors as well, such as conserving energy of the first balloon 404A. Further, in some implementations, the first balloon 404A may determine the distance between the first one or more altitudes 516A and the planned altitude 512A.

Moreover, in the illustrated example, the first one or more altitudes 516A includes three altitudes: a first altitude 516A1, a second altitude 516A2, and a third altitude 516A3. However, in other examples, the first one or more altitudes 516A may include less than three altitudes or more than three altitudes. And in the illustrated example, the first altitude 516A1 is less than the second altitude 516A2 and the second altitude 516A2 is less than the third altitude 516A3. However, in other examples, the first altitude 516A1 may be greater than the second altitude 516A2 and the second altitude 516A2 may be greater than the third altitude 516A3.

In some implementations, the fleet planner 402 may determine the number of altitudes in the first one or more altitudes 516A. And in at least one such implementation, the fleet planner 402 may determine the number of altitudes in the one or more first altitudes 516A based at least in part on acquisition of wind data for the wind model. For example, the fleet planner 402 may factor the need for wind data in a certain area into the determination of the number of first one or more altitudes 516A. Further, in some implementations, the first balloon 404A may determine the number altitudes in the first one or more altitudes 516A.

The first altitude 516A1, the second altitude 516A2, and the third altitude 516A3 may be spaced apart a variety of distances. In some implementations, the fleet planner 402 may determine a distance between the first altitude 516A1 and the second altitude 516A2, a distance between the second altitude 516A2 and the third altitude 516A3, and/or a distance between the first altitude 516A1 and the third altitude 516A3. And in at least one such implementation, the fleet planner 402 may determine the distance between the first altitude 516A1 and the second altitude 516A2, the distance between the second altitude 516A2 and the third altitude 516A3, and/or the distance between the first altitude 516A1 and the third altitude 516A3 based at least in part on acquisition of wind data for the wind model.

For example, the fleet planner 402 may factor the need for wind data in a certain area into the determination of the distance between the first altitude 516A1 and the second altitude 516A2, a distance between the second altitude 516A2 and the third altitude 516A3, and/or a distance between the first altitude 516A1 and the third altitude 516A3. The fleet planner may determine the distance between the first altitude 516A1 and the second altitude 516A2, the distance between the second altitude 516A2 and the third altitude 516A3, and/or the distance between the first altitude 516A1 and the third altitude 516A3 based at least in part on other factors as well, such as conserving energy of the balloon 404A. Further, in some implementations, the first balloon 404A may determine the distance between the first altitude 516A1 and the second altitude 516A2, a distance between the second altitude 516A2 and the third altitude 516A3, and/or a distance between the first altitude 516A1 and the third altitude 516A3.

In some implementations, the fleet planner 402 may determine the distance between the first one or more altitudes 516A and the planned altitude 512A, the number of altitudes in the first one or more altitudes 516A, and/or the distance between altitudes of the one first one or more altitudes 516A based on the wind model used to determine the flight plan of the first balloon 404A. For instance, the distance between the first one or more altitudes 516A and the planned altitude 512A, the number of altitudes in the first one or more altitudes 516A, and/or the distance between altitudes of the one first one or more altitudes 516A may be based on a resolution of the wind model used to determine the flight plan of the first balloon 404A.

For instance, the wind model used to determine the flight plan for the first balloon 404A may include predicted wind data for various pressure-altitude intervals and the first one or more altitudes 516A may be located within the pressure-altitude intervals. As one example, when the pressure-altitude interval of the wind model is a 100 pascal layer, the first one or more altitudes 516A may be located every 50 pascals. With this arrangement, sampling of wind data within a predetermined space (or voxel) may be twice the resolution of the wind model used to determine the flight plan for the first balloon 404A. In an example, the predetermined space may be 100 pascals by 10 km. And in such an example, the predetermined space may have a variety of shapes, such as a hexagon or a square.

However, in some implementations, sampling of wind data within a predetermined space may be greater than twice the resolution of the wind model used to determine the flight plan of the first balloon 404A, such as four times the resolution of the wind model or eight times the resolution of the wind model. With this arrangement, the fleet planner 402 may use the received wind data to make a determination as to whether the resolution of the wind model is appropriate for the predetermined space.

Further, in some implementations, sampling of wind data within a predetermined space may be equal to the resolution of the wind model used to determine the flight plan of the first balloon 404A.

In addition, in some implementations, when two or more models with different resolutions are used to determine the flight plan of the first balloon 404A, the distance between the first one or more altitudes 516A and the planned altitude 512A, the number of altitudes in the first one or more altitudes 516A, and/or the distance between altitudes of the one first one or more altitudes 516A may be based on the wind model with the highest resolution.

Further, in some implementations, when the wind model includes a grid having a plurality of predetermined spaces, the sampling of wind data may occur within each predetermined space of the plurality of predetermined spaces rather than on boundaries of the predetermined spaces.

Further, at point 514A, the first balloon 404A may receive wind data at each altitude of the first one or more altitudes 516A. In the illustrated example, the first balloon 404A may receive first wind data WDA1 at first altitude 516A1, second wind data WDA2 at second altitude 516A2, and third wind data WDA3 at third altitude 516A3. First wind data WDA1 may indicate actual wind conditions at the first altitude 516A1, second wind data WDA2 may indicate actual wind conditions at the second altitude 516A2, and third wind data WDA3 may indicate actual wind conditions at the third altitude 516A3. In some embodiments, the first balloon 404A may receive WDA1, WDA2, and/or WDA3 by using a radiosonde or other probe operable to measure wind conditions.

Further still, at point 514A, the fleet planner 402 may send one or more instructions to the first balloon 404A, and the one or more instructions may indicate to navigate to the first one or more altitudes 516A and receive wind data at each altitude of the first one or more altitudes 516A through a variety of communication techniques. For example, the fleet planner 402 may send one or more instructions to the first balloon 404A, and the one or more instructions may indicate to navigate to the first one or more altitudes 516A and receive wind data at each altitude of the one or more altitudes 516A using any or all of the communication techniques that a balloon may use to communicate with another balloon and/or a ground-based station as described herein.

In some examples, the fleet planner 402 may send one instruction to the first balloon 404A to implement its respectively determined flight plan. However, in other examples, the fleet planner 402 may send more than one instruction to the first balloon 404A to implement its respectively determined flight plan, such as two instructions. For example, the fleet planner 402 may send a first instruction to the first balloon 404A that may indicate to navigate to the one or more altitudes 516A, and the fleet planner 402 may send a second instruction to the first balloon 404A that may indicate to receive wind data at each altitude of the first one or more altitudes 516A. And in at least one such example, the fleet planner 402 may send the second instruction to the first balloon 404A after the fleet planner 402 sends the first instruction to the first balloon 404A. For instance, the fleet planner 402 may send the second instruction to the first balloon 404A after (or before) the first balloon 404A navigates to the first one or more altitudes 516A.

In some implementations, the one or more instructions to the first balloon 404A may indicate to stop at each altitude of the first one or more altitudes 516A for a predetermined period of time. In some examples, the predetermined period of time may correspond with a time period for the first balloon 404A to remain substantially stationary at a particular altitude of the first one or more altitudes 516A and receive wind data at the particular altitude. And in such examples, the predetermined time period may be based on a variety of parameters, such as actual wind conditions. The term "substantially stationary," as used in this disclosure, refers to exactly the stationary and/or one or more deviations from exactly stationary that do not significantly impact altitude control of balloons to improve wind data as described herein.

Further, in some implementations, the one or more instructions to the first balloon 404A may indicate to transition through the first one or more altitudes 516A without stopping at the one or more altitudes 516A. In some examples, dynamics during the transition of the first balloon (e.g., wind shear) may be accounted for (e.g., modeled) by the fleet planner 402 as the first balloon 404A receives wind data at each altitude of the first one or more altitudes 516A. Further, in some examples, a speed or acceleration of the transition may be selected based on a variety of parameters, such as actual wind conditions. And in such examples, the speed of the transition may be less than the speed of the first balloon 404A in other situations.

At point 514B, the fleet planner 402 may send one or more instructions to the second balloon 404B to implement its respectively-determined flight plan, and the one or more instructions may indicate to navigate to second one or more altitudes 516B and receive wind data at each altitude of the second one or more altitudes 516B.

In the illustrated example, the second initial altitude 508B is greater than the second one or more altitudes 516B, and the second one or more altitudes 516B is greater than the planned altitude 512B. Accordingly, the fleet planner 402 may send one or more instructions the second balloon 404B to implement its respectively determined flight plan, and the one or more instructions may indicate to descend to the second one or more altitudes 516B. However, in other examples, the second initial altitude 508B may be less than the second one or more altitudes 516B, and the second one or more altitudes 516B may be less than the planned altitude 512B. And, in other examples, the fleet planner 402 may send one or more instructions to the second balloon 404B to implement its respectively-determined flight plan, and the one or more instructions may indicate to ascend to the second one or more altitudes 516B.

The second one or more altitudes 516B may be located at various different distances from the planned altitude 512B in various different embodiments. The distances that the second one or more altitudes 516 may be located from the planned altitude 512B may be the same as or similar to the distances that the first one or more altitudes 516A may be located from the planned altitude 512A. However, in some implementations, the distance that the second one or more altitudes 516B may be located from the planned altitude 512B may be different than the distance that the first one or more altitudes 516A may be located from the planned altitude 512A.

In some implementations, the fleet planner 402 may determine a distance between the second one or more altitudes 516B and the planned altitude 512B. And in at least one such implementation, the fleet planner 402 may determine the distance between the second one or more altitudes 516B and the planned altitude 512B based at least in part on acquisition of wind data for the wind model. For example, the fleet planner 402 may factor the need for wind data in a certain area into the determination of the distance between the second one or more altitudes 516B and the planned altitude 512B. The fleet planner may determine the distance between the second one or more altitudes 516B and the planned altitude 512B based at least in part on other factors as well, such as conserving energy of the second balloon 404B. Further, in some implementations, the second balloon 404B may determine the distance between the second one or more altitudes 516B and the planned altitude 512B.

Further, in the illustrated example, the second one or more altitudes 516B includes three altitudes: a fourth altitude 516B1, a fifth altitude 516B2, and a sixth altitude 516B3. However, in other examples, the second one or more altitudes 516B may include less than three altitudes or more than three altitudes. And in the illustrated example, the fourth altitude 516B1 is greater than the fifth altitude 516B2 and the fifth altitude 516B2 is greater than the sixth altitude 516B3. However, in other examples, the fourth altitude 516B1 may be less than the fifth altitude 516B2 and the fourth altitude 516B3 may be less than the sixth altitude 516B3.

In some implementations, the fleet planner 402 may determine the number of altitudes in the second one or more altitudes 516B. And in at least one such implementation, the fleet planner 402 may determine the number of altitudes in the second or more altitudes 516B based at least in part on acquisition of wind data for the wind model. For example, the fleet planner 402 may factor the need for wind data in a certain area into the determination of the number of second one or more altitudes 516B. Further, in some implementations, the second balloon 404B may determine the number altitudes in the second one or more altitudes 516B.

The fourth altitude 516B1, the fifth altitude 516B2, and the sixth altitude 516B3 may be spaced apart a variety of distances. The distances that the fourth altitude 516B1, the fifth altitude 516B2, the sixth altitude 516B3 may be located from each other may be the same as or similar to the distances that the first altitude 516A1, the second altitude 516A2, and the third altitude 516A3 may be located from each other. However, in some implementations, the distances that the fourth altitude 516B1, the fifth altitude 516B2, the sixth altitude 516B3 may be located from each other may be different than the distances that the first altitude 516A1, the second altitude 516A2, and the third altitude 516A3 may be located from each other.

In some implementations, the fleet planner 402 may determine the distance between the second one or more altitudes 516B and the planned altitude 512B, the number of altitudes in the second one or more altitudes 516B, and/or the distance between altitudes of the second one or more altitudes 516B based on the wind model used to determine the flight plan of the second balloon 404B in the same or similar way the fleet planner 402 may determine the distance between the first one or more altitudes 516A and the planned altitude 512A, the number of altitudes in the first one or more altitudes 516A, and/or the distance between altitudes of the first one or more altitudes 516A based on the wind model used to determine the flight plan of the first balloon 404A.

Further still, at point 514B, the fleet planner 402 may send one or more instructions to the second balloon 404B, and the one or more instructions may indicate at least in part to receive wind data at each altitude of the second one or more altitudes 516B. In the illustrated example, the second balloon 404B may receive third wind data WDB1 at fourth altitude 516B1, fourth wind data WDB2 at fifth altitude 516B2, and fifth wind data WDB3 at sixth altitude 516B3. Fourth wind data WDB1 may indicate actual wind conditions at the fourth altitude 516B1, fifth wind data WDB2 may indicate actual wind conditions at the fifth altitude 516B2, and sixth wind data WDB3 may indicate actual wind conditions at the sixth altitude 516B3. In some examples, the second balloon 404B may receive wind data WDB1, WDB2, and/or WDB3 the same or similar way as the first balloon 404A may receive wind data WDA1, WDA2, and/or WDA3 as described herein. However, in other examples, the second balloon 404B may receive wind data WDB1, WDB2, and/or WDB3 a different way than the first balloon 404B may receive wind data WDA1, WDA2, and/or WDA3.

Further still, at point 514B, the fleet planner 402 may send one or more instructions to the second balloon 404B, and the one or more instructions may indicate to navigate to the second one or more altitudes 516B and receive wind data at each altitude of the second one or more altitudes 516B the same or similar way as the fleet planner 402 may send one or more instructions to the first balloon 404A that may indicate to navigate to the first one or more altitudes 516A and receive wind data at each altitude of the first one or more altitudes 516A as described herein. However, in some examples, the fleet planner 402 may send one or more instructions to the second balloon 404B, and the one or more instructions may indicate to navigate to the second one or more altitudes 516B and receive wind data at each altitude of the second one or more altitudes in a different way than the fleet planner 402 may send one or more instructions to the first balloon 404A that may indicate to navigate to the first one or more altitudes 516A and receive wind data at each altitude of the second one or more altitudes. The fleet planner 402 may send one or more instructions to the second balloon 404B, and the one or more instructions may indicate to navigate to the second one or more altitudes 516B and receive wind data at each altitude of the second one or more altitudes 516B using any or all of the communication techniques that a balloon may use to communicate with another balloon and/or a ground-based station as described herein.

In some implementations, the one or more instructions to the second balloon 404B may indicate to stop at each altitude of the second one or more altitudes 516B for a predetermined period of time. In some examples, the predetermined period of time may correspond with a time period for the second balloon 404B to remain substantially stationary at a particular altitude of the second one or more altitudes 516B and receive wind data at the particular altitude. And in such examples, the predetermined time period may be based on a variety of parameters, such as actual wind conditions.

Further, in some implementations, the one or more instructions to the second balloon 404B may indicate to transition through the second one or more altitudes 516B without stopping at the second one or more altitudes 516B. In some examples, dynamics during the transition of the second balloon 404B may be accounted for by the fleet planner 402 as the second balloon 404B receives wind data at each altitude of the second one or more altitudes 516B. Further, in some examples, a speed or acceleration of the transition may be selected based on a variety of parameters, such as actual wind conditions. And in such examples, the speed of the transition may be less than the speed of the second balloon 404B in other situations.

Example 500 continues at point 518 with receiving the wind data from at least one balloon of the one or more balloons in the balloon network 404 for which a flight plan is implemented. In particular, at point 518, the fleet planner 402 may receive the wind data from the first balloon 404A and/or receive wind data from the second balloon 404B using any or all of the communication techniques that a balloon may use to communicate with another balloon and/or a ground-based station as described herein.

The first balloon 404A and/or the second balloon 404B may transmit the wind data received at points 514A and 514B to the fleet planner 402 in various different ways in various different embodiments. As one example, the first balloon 404A may transmit the wind data received at point 514A and/or the second balloon 404B may transmit the wind data received at point 514B to the fleet planner 402 after particular wind data is received. With this arrangement, the first balloon 404A may transmit WDA1 after it is received, WDA2 after it is received, and/or WDA3 after it is received; and/or the second balloon 404B may transmit WDB1 after it is received, WDB2 after it is received, and/or WDB3 after it is received.

As another example, the first balloon 404A may transmit the wind data received at point 514A and/or the second balloon 404B may transmit the wind data received at point 514B to the fleet planner 402 in response to a triggering event. For instance, the triggering event may be the passage of a certain time period, such as 5 minutes, 15 minutes, 30 minutes, or one hour. As one example, when the certain time period is 15 minutes, the first balloon 404A receives WDA1 in 15 minutes, and the second balloon 404B receives WDB1, WDB2, and WDB3 in 15 minutes, the first balloon 404A may transmit WDA1 to the fleet planner 402 and the second balloon 404B may transmit WDB1, WDB2, and WDB3 to the fleet planner 402. With this arrangement, one or more resources of the balloon network 404, such as bandwidth, may be conserved and/or energy of the first balloon 404A and/or the second balloon 404B may be conserved.

Further, the triggering event may be receiving a request from the fleet planer 402. The request may be any suitable signal using any or all of the communication techniques that a balloon may use to communicate with another balloon and/or a ground-based station as described herein. With this arrangement, one or more resources of the balloon network 404, such as bandwidth, may be conserved and/or energy of the first balloon 404A and/or the second balloon 404B may be conserved.

In addition, with this arrangement, the fleet planner 402 may receive different amounts of wind data from the first balloon 404A and the second balloon 404B. For instance, when the fleet planner 402 sends one or more requests to the first balloon 404A and the second balloon 404B, the fleet planner 402 may send more requests to the first balloon 404A than the second balloon 404B. And with this arrangement, the fleet planner 402 may receive wind data from the first balloon 404A and the second balloon 404B at different rates. For instance, when the fleet planner 402 sends one or more requests to the first balloon 404A and the second balloon 404B, the fleet planner 402 may send requests more frequently to the first balloon 404A than the second balloon 404B. However, in some implementations, the fleet planner 402 may send more requests (and/or requests more frequently) to the second balloon 404B than the first balloon 404A.

In some implementations, the first balloon 404A may transmit wind data to the fleet planner 402 differently than the second balloon 404B may transmit wind data to the fleet planner 402. For example, the first balloon 404A may transmit the wind data received at point 514A after particular wind data is received, and the second balloon 404B may transmit the wind data received at point 514B in response to a triggering event.

Example 500 continues at point 520 with updating the wind model based at least in part on the received wind data. In particular, at point 520, the fleet planner 402 may update the wind model based at least in part on the wind data received at point 518. In some examples, one or more actions that correspond with point 518 and one or more actions that correspond with point 520 may be performed concurrently.

The fleet planner 402 may update the wind model in various different ways in various different embodiments. As one example, the fleet planner 402 may update the wind model based at least in part on the received wind data as the wind data is received from the first balloon 404A and/or the wind data is received from the second balloon 404B. As another example, the fleet planner 402 may update the wind model based at least in part on the received wind data in response to a triggering event. For instance, the triggering event may be the passage of a certain time period, such as 5 minutes, 15 minutes, 30 minutes, or one hour. Further, the triggering event may be receiving a request from one or more entities, such as the first balloon 404A, the second balloon 404B, and/or the ground-based station 406. With this arrangement, the fleet planner 402 may conserve energy.

Moreover, one or more actions that correspond with points 510-520 may be performed at various different time periods in various different embodiments. For instance, the one or more actions that correspond with point 510 may be performed at a first time period, the one or more actions that correspond with point 514A may be performed at a second time period, the one or more actions that correspond with point 514B may be performed at a third time period, the one or more actions that correspond with point 518 may be performed at a fourth time period, and the one or more actions that correspond with point 520 may be performed at a fifth time period. However, in other examples, at least some of the actions of the one or more actions that correspond with points 510, 514A, 514B, 518, and 520 may be performed concurrently.

In some implementations, the first one or more altitudes 516A may include each altitude between the initial altitude 508A and the planned altitude 512A. Moreover, in some implementations, the second one or more altitudes 516B may include each altitude between the initial altitude and the planned altitude 512B.

In some examples, when the first one or more altitudes 516A includes each altitude between the first initial altitude 508A and the planned altitude 512A and the fleet planner 402 sends one or more instructions to the first balloon 404A to transition through the first one or more altitudes 516A and receive wind data at each altitude of the first one or more altitudes 516A, the first balloon 404A may continuously sample wind data between the first initial altitude 508A and the planned altitude 512A.

In some examples, when the second one or more altitudes 516B includes each altitude between the second initial altitude 508B and the planned altitude 512B and the fleet planner 402 sends one or more instructions to the second balloon 404B to transition through the second one or more altitudes 516B and receive wind data at each altitude of the second one or more altitudes 516B, the second balloon 404B may continuously sample wind data between the second initial altitude 508B and the planned altitude 512B.

Figure 6:
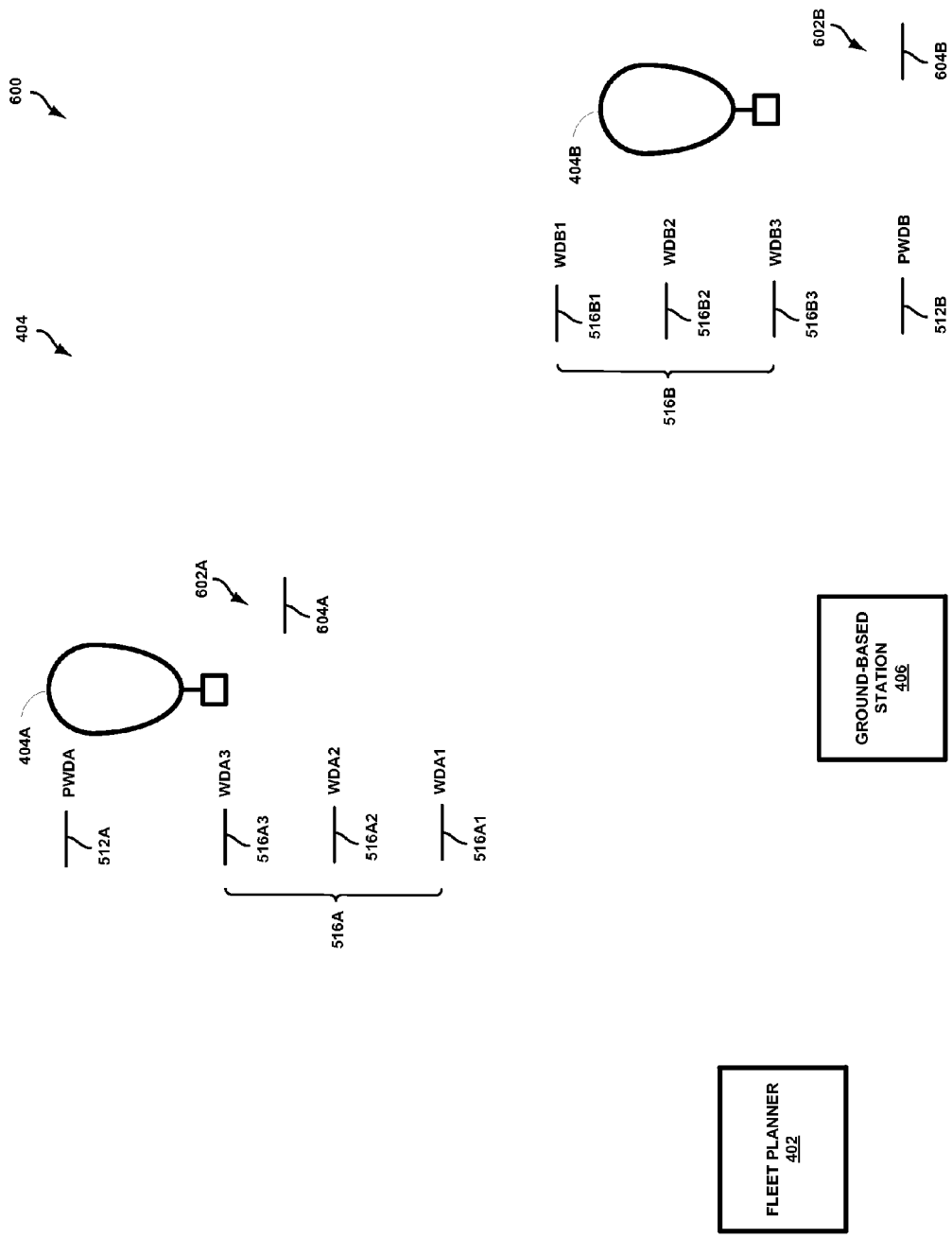
FIG. 6 illustrates an example of updating at least one flight plan based at least in part on received wind data, according to an example embodiment.

C. Updating at Least One Flight Plan Based at Least in Part on Received Wind Data FIG. 6 depicts an example 600 of updating at least one flight plan based at least in part on received wind data, according to an example embodiment. Example 600 may occur in connection with example 500. As shown in FIG. 6, example 600 includes the fleet planner 402, the balloon network 404, and the ground-based station 406. The balloon network 404 is configured to provide data service to the coverage area 408 (not shown). Example 600 may be carried out in the coverage area 408.

The balloon network 404 includes two balloons: the first balloon 404A and the second balloon 404B. And as shown in FIG. 6, the first balloon 404A is located at the third altitude 516A3 of the first one or more altitudes 516A and the second balloon 404B is located at the sixth altitude 516B3 of the second one or more altitudes 516B.

Example 600 is generally described as being carried out by the fleet planner 402. For illustrative purposes, example 600 is described in a series of actions as shown in FIG. 6, though example 600 could be carried out in any number of actions and/or combinations of actions.

Example 600 begins at point 602A and at point 602B with updating at least one flight plan based at least in part on the received wind data. In particular, at point 602A, the fleet planner 402 may update the flight plan determined for the first balloon 404A at point 510 in example 500 based at least in part on the wind data received at the first one or more altitudes 516A at point 514A and/or the wind data received at the second one or more altitudes 516B at point 514B in example 500. And at point 602B the fleet planner 402 may update the flight plan determined for the second balloon 404B at point 510 in example 500 based at least in part on the wind data received at the second one or more altitudes 516B at point 514B and/or the wind data received at the first one or more altitudes 516A at point 514A in example 500.

In some implementations, updating at least one flight plan based at least in part on the received wind data may involve determining a second planned altitude and sending second one or more instructions to the balloon for which the at least one flight plan is updated, and the second one or more instructions may indicate to navigate to the second planned altitude. In some examples, one or more actions that correspond with point 602A and one or more actions that correspond with point 602B may be performed concurrently. However, in other examples, at least one action that corresponds with point 602A may be performed at a first time period, and at least one action that corresponds with point 602B may be performed at a second time period.

At point 602A, the fleet planner 402 may determine a second planned altitude 604A for the first balloon 404A. And at point 602B, the fleet planner 402 may determine a second planned altitude 604B for the second balloon 404B. In the illustrated example, the second planned altitude 604A is greater than the second planned altitude 604B. However, in other examples, the second planned altitude 604A may be less than or equal to the second planned altitude 604B.

In some implementations, the fleet planner 402 may determine the second planned altitude 604A and/or the second planned altitude 604B based at least in part on movement of the balloon for which the flight plan was determined. The movement of the first balloon 404A and/or the movement of the second balloon 404B may be based on one or more of: a desired displacement, a desired horizontal movement, a desired change in altitude, a desired velocity, a desired change in velocity, and a desired acceleration.

And in some implementations, the movement of the first balloon 404A and/or the movement of second balloon 404B may be based on a state of the network 404, such as data-communication requirements of the network 404. For example, the fleet planner 402 may assess altitudes where predicted wind data indicates that a wind condition may carry at least one balloon of the balloon network 404 to a desired horizontal location. With this arrangement, the second planned altitude 604A and/or second planned altitude 604B may help to achieve a desired topology for the balloon network 404.

Further, in some implementations, the fleet planner 402 may determine the second planned altitude 604A and/or the second planned altitude 604B based at least in part on acquisition of wind data for the wind model. And the fleet planner 402 may accordingly factor the need for such data in a certain area into the determination of the second planned altitude 604A and/or the determination of the second planned altitude 604B. With this arrangement, the second planned altitude 604A and/or the second planned altitude 604B may differ from what they might be if they were only based on the movement of the balloon for which the flight plan is determined.

Further still, in some implementations, the fleet planner 402 may determine the second planned altitude 604A and/or the second planned altitude 604B based at least in part on both movement of the balloon for which the flight was determined and acquisition of wind data for the wind model. In some examples, the fleet planner 402 may determine the second planned altitude 604A the same way, the similar way, or a different way as the fleet planner may determine the second planned altitude 604B.

Second planned altitudes 604A, 604B may take various different forms in various different embodiments. In some implementations, when any or all of the wind data received at the first one or more altitudes 516A in example 500 (e.g., WDA1, WDA2, and WDA3) and/or the wind data received at the second one or more altitudes 516B (e.g., WDB1, WDB2, and WDB3) indicates that a predicted wind condition of PWDA may not correspond with an actual wind condition at the planned altitude 512A, the second planned altitude 604A may be different than the planned altitude 512A. And in some implementations, when any or all of wind data WDA1, WDA2, and WDA3 and/or WDB1, WDB2, and WDB3 indicates that a predicted wind condition of PWDA may correspond with an actual wind condition at the planned altitude 512A, the second planned altitude 604A may be substantially the same as the planned altitude 512A. In the illustrated example, the second planned altitude 604A is less than the planned altitude 512A. However, in other examples, the second planned altitude 604A may be greater than or substantially the same as the planned altitude 512A.

Further, in some implementations, when any or all of the wind data WDB1, WDB2, and WDB3 and/or WDA1, WDA2 and WDA3 indicates that a predicted wind condition of PWDB may not correspond with an actual wind condition at the planned altitude 512B, the second planned altitude 604B may be different than the planned altitude 512B. And in some implementations, when any or all of WDB1, WDB2, and WDB3 and/or WDA1, WDA2, and WDA3 indicates that a predicted wind condition of PWDB may correspond with an actual wind condition at the planned altitude 512B, the second planned altitude 604B may be substantially the same as the planned altitude 512B. In the illustrated example, the second planned altitude 604B is substantially the same as the planned altitude 512B. However, in other examples, the second planned altitude 604B may be greater or less than the planned altitude 512B.

In addition, the second planned altitudes 604A, 604B may be greater than, less than, or substantially the same as any one of the altitudes of the first one or more altitudes 516A and/or the second one or more altitudes 516B. In the illustrated example, the second planned altitude 604A is less than the third altitude 516A3, the second planned altitude 604A is greater than second altitude 516A2, and the second planned altitude 604A is greater than first altitude 516A1. However, in other examples, the second planned altitude 604A may be greater than or substantially the same as the third altitude 516A3, the second planned altitude 604A may be less than or substantially the same as the second altitude 516A2, and the second planned altitude 604A may be less than or substantially the same as the first altitude 516A1.

Moreover, in the illustrated example, the second planned altitude 604B is less than the fourth altitude 516B1, the second planned altitude 604B is less than the fifth altitude 516B2, and the second planned altitude 604B is less than the sixth altitude 516B3. However, in other examples, the second planned altitude 604B may be greater than or substantially the same as the fourth altitude 516B1, the second planned altitude 604B may be greater than or substantially the same as the fifth altitude 516B2, and the second planned altitude 604B3 may be greater than or substantially the same as the six altitude 516B3.

Further, at point 602A, the fleet planner 402 may send second one or more instructions to the first balloon 404A and second balloon 404B, wherein the second one or more instructions to the first balloon 404A may indicate to navigate to the second planned altitude 604A and the second one or more instructions to the second balloon 404B may indicate to navigate to the second planned altitude 604B. As noted, in the illustrated example, the second planned altitude 604A is less than the third altitude 516A3, the second planned altitude 604A is greater than second altitude 516A2, and the second planned altitude 604A is greater than first altitude 516A1. Accordingly, the fleet planner 402 may send second one or more instructions to the first balloon 404A, and the second one or more instructions may indicate to descend to the second planned altitude 604A. However, in other examples, the fleet planner 402 may send second one or more instructions the first balloon 404A, and the second one or more instructions may indicate to ascend to the second planned altitude 604A.

The fleet planner 402 may send second one or more instructions to the first balloon 404A, and the second one or more instructions may indicate to navigate to the second planned altitude 604A the same or similar way as the fleet planner 402 may send one or more instructions to the first balloon 404A that may indicate at least in part to navigate to the planned altitude 512A. However, in some examples, the fleet planner 402 may send second one or more instructions to the first balloon 404A in example 600 in a different way than the fleet planner 402 may send one or more instructions to the first balloon 404A in example 500. The fleet planner 402 may send second one or more instructions to the first balloon 404A in example 600 using any or all of the communication techniques that a balloon may use to communicate with another balloon and/or a ground-based station as described herein.

In addition, the fleet planner 402 may send third one or more instructions to the first balloon 404A, and the third one or more instructions may indicate to receive wind data at the second planned altitude 604A, the first balloon 404A may transmit the wind data received at the second planned altitude 604A to the fleet planner 402, the fleet planner 402 may receive the wind data from the first balloon 404A, and/or the fleet planner 402 may update the wind model based at least in part on the received wind data.

The fleet planner 402 may send third one or more instructions to the first balloon 404A, and the third one or more instructions may indicate to receive wind data at the second planned altitude 604A the same or similar way as the fleet planner 402 may send one or more instructions to the first balloon 404A that may indicate at least in part to receive wind data at the first one or more altitudes 516A as described with reference to point 514A in example 500, the first balloon 404A may transmit the wind data received at the second planned altitude 604A to the fleet planner 402 the same or similar way as the first balloon 404A may transmit the wind data received at point 514A as described with reference to point 518 in example 500, the fleet planner 402 may receive the wind data from the first balloon 404A the same or similar way as the fleet planner 402 may receive the wind data from the first balloon 404A as described with reference to point 518 in example 500, and/or the fleet planner 402 may update the wind model based at least in part on the received wind data the same or similar way as the fleet planner 402 may update the wind model based at least in part on the received wind data as described with reference to point 520 in example 500.

Further still, at point 602B, the fleet planner 402 may send second one or more instructions to the second balloon 404B, and the second one or more instructions may indicate to navigate to the second planned altitude 604B. As noted, in the illustrated example, the second planned altitude 604B is less than the fourth altitude 516B1, the second planned altitude 604B is less than the fifth altitude 516B2, and the second planned altitude 604B is less than the sixth altitude 516B3. Accordingly, the fleet planner 402 may send second one or more instructions to the second balloon 404B, and the second one or more instructions may indicate descend to the second planned altitude 604B. However, in other examples, the fleet planner 402 may send second one or more instructions to the second balloon 404B, and the second one or more instructions may indicate to ascend to the second planned altitude 604B.

The fleet planner 402 may send second one or more instructions to the second balloon 404B, and the second one or more instructions may indicate to navigate to the second planned altitude 604B the same or similar way as the fleet planner 402 may send one or more instructions to the second balloon 404B that may indicate at least in part to navigate to the planned altitude 512B. However, in some examples, the fleet planner 402 may send second one or more instructions to the second balloon 404B in example 600 in a different way than the fleet planner 402 may send one or more instructions to the first balloon 404A in example 500. The fleet planner 402 may send second one or more instructions to the second balloon 404B in example 600 using any or all of the communication techniques that a balloon may use to communicate with another balloon and/or a ground-based station as described herein.

In addition, the fleet planner 402 may send third one or more instructions to the second balloon 404B, and the second one or more instructions may indicate to receive wind data at the second planned altitude 604B, the second balloon 404B may transmit the wind data received at the second planned altitude 604B to the fleet planner 402, the fleet planner 402 may receive the wind data from the second balloon 404B, and/or the fleet planner 402 may update the wind model based at least in part on the received wind data.

The fleet planner 402 may send third one or more instructions to the second balloon 404B, and the third one or more instructions may indicate to receive wind data at the second planned altitude 604B the same or similar way as the fleet planner 402 may send one or more instructions to the second balloon 404B that may indicate at least in part to receive wind data at the second one or more altitudes 516B as described with reference to point 514B in example 500, the second balloon 404B may transmit the wind data received at the second planned altitude 604B to the fleet planner 402 the same or similar way as the first balloon 404A may transmit the wind data received at point 514A as described with reference to point 518 in example 500, the fleet planner 402 may receive the wind data from the second balloon 404B the same or similar way as the fleet planner 402 may receive the wind data from the first balloon 404A as described with reference to point 518 in example 500, and/or the fleet planner 402 may update the wind model based at least in part on the received wind data the same or similar way as the fleet planner 402 may update the wind model based at least in part on the received wind data as described with reference to point 520 in example 500.

D. At Least One Balloon Determining a Second Planned Altitude Based at Least in Part on Received Wind Data In some examples, the fleet planner 402 might not update one or more flight plans based at least in part on received wind data. Instead, the balloons for which the one or more flight plans is not updated may each determine a second planned altitude based at least in part on the received wind data. With this arrangement, the balloons may be autonomous and/or semi-autonomous.

Figure 7:
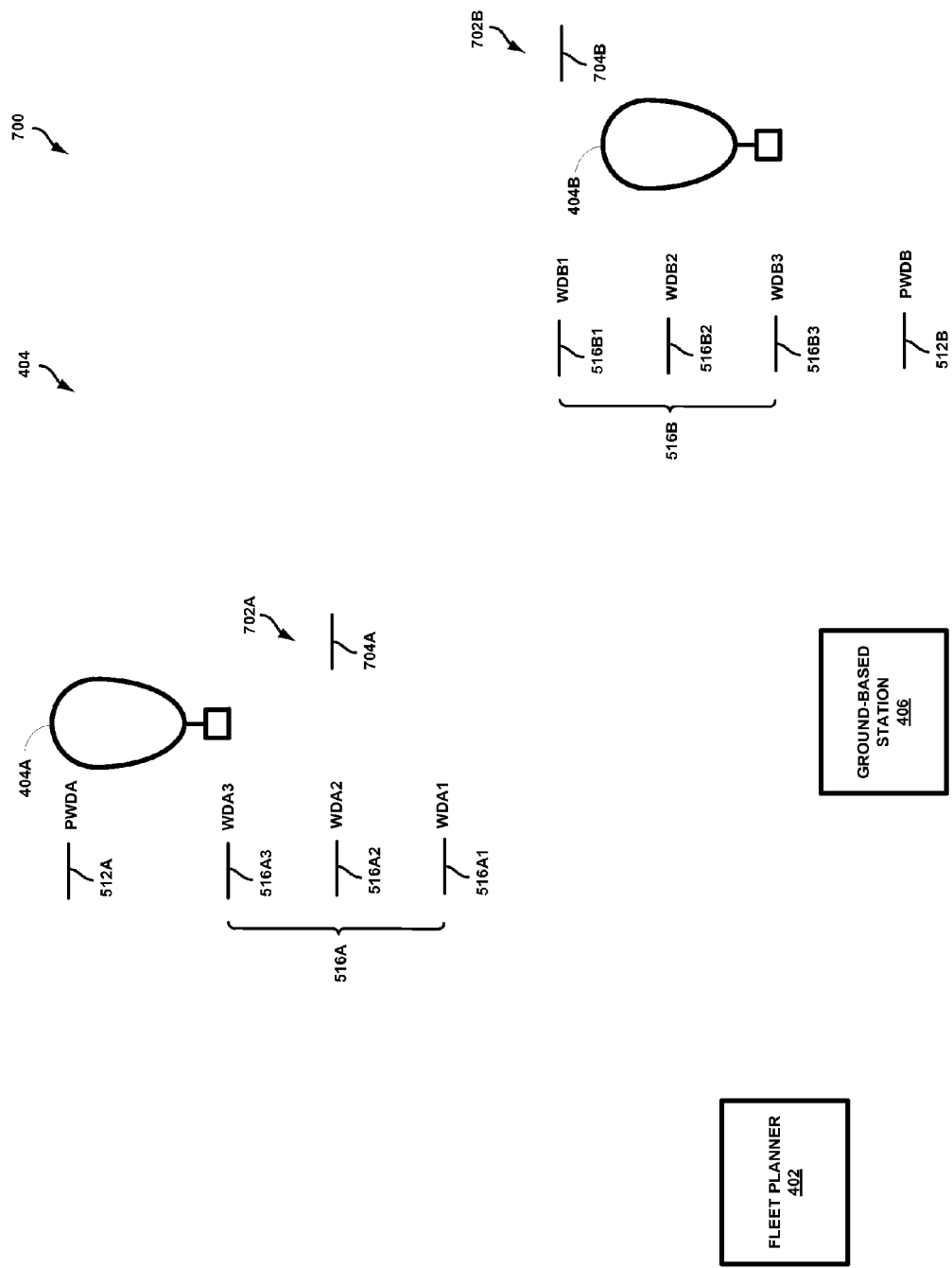
FIG. 7 illustrates an example of determining a second planned altitude based at least in part on received wind data.

FIG. 7 depicts an example 700 of determining a second planned altitude based at least in part on received wind data, according to an example embodiment. Example 700 may occur in connection with example 500. As shown in FIG. 7, example 700 includes the fleet planner 402, the balloon network 404, and the ground-based station 406. The balloon network is configured to provide data service in the coverage area 408 (not shown). Example 700 may be carried out in the coverage area 408.

The balloon network 404 includes two balloons: the first balloon 404A and the second balloon 404B. And as shown in FIG. 7, the first balloon 404A is located at the third altitude 516A3 of the first one or more altitudes 516A and the second balloon 404B is located at the sixth altitude 516B3 of the second one or more altitudes 516B.

Example 700 is generally described as being carried out by the fleet planner 402. For illustrative purposes, example 700 is described in a series actions as shown in FIG. 7, though example 700 could be carried out in any number of actions and/or combinations of actions.

Example 700 begins at point 702A and at point 702B with sending one or more instructions to the one or more balloons for which a flight plan is determined to implement the respectively-determined flight plan, wherein the one or more instructions indicate to determine a second planned altitude based at least in part on the received wind data and navigate to the second planned altitude. Point 702A may occur in connection with point 514A and/or point 702B may occur in connection with point 514B.

For example, in some embodiments when example 700 occurs in connection with example 500, the one or more instructions to a given one of the balloons could indicate to navigate to one or more altitudes, receive wind data at each altitude of the one or more altitudes, determine a second planned altitude based at least in part on the received wind data, and navigate to the second planned altitude.

In particular, at point 702A, the fleet planner 402 may send one or more instructions to the first balloon 404A to implement its respectively-determined flight plan, and the one or more instructions may indicate to determine a second planned altitude 704A based at least in part on the wind data received at the first one or more altitudes 516A and/or the wind data received at the second one or more altitudes 516B in example 500 and navigate to the second planned altitude 704A. And at point 702B the fleet planner 402 may send one or more instructions to the second balloon 404B to implement is respectively-determined flight plan, and the one or more instructions may indicate to determine a second planned altitude 704B based at least in part on the wind data received at the second one or more altitudes 516B and/or the wind data received at the first one or more altitudes 516A in example 500 and navigate to the second planned altitude 704B. In some examples, one or more actions that correspond with point 702A and one or more actions that correspond with point 702B may occur concurrently. However, in other examples, at least one action that corresponds with point 702A may be performed at a first time period and at least one action that corresponds with point 702B may be performed at a second time period.

The fleet planner 402 may send one or more instructions to the first balloon 404A to implement its respectively-determined flight plan, and the one or more instructions may indicate to determine the second planned altitude 704A and navigate to the second planned altitude 704A using any or all of the communication techniques that a balloon may use to communicate with another balloon and/or a ground-based station as described herein.

In some implementations, the first balloon 404A may determine the second planned altitude 704A based at least in part on the wind data received at the first one or more altitudes 516A and/or the wind data received at the second one or more altitudes 516B by selecting a particular altitude from the group consisting of the first altitude 516A1, the second altitude 516A2, the third altitude 516A3, and the planned altitude 512A. In the illustrated example, the first balloon 404A may select the second altitude 516A2 as the second planned altitude 704A. Accordingly, the first balloon 404A may navigate to the second planned altitude 704A at least in part by descending to the second planned altitude 704B. However, in other examples, the second balloon 404A may select the first altitude 516A1, the third altitude 516A3, or the planned altitude 512A. And in other examples, the second balloon 404B may navigate to the second planned altitude 704B at least in part by ascending or descending to the second planned altitude 704A.

For example, when any or all of the wind data received at the first one or more altitudes 516A in example 500 (e.g., WDA1, WDA2, and WDA3) and/or the wind data received at the second one or more altitudes 516B (e.g., WDB1, WDB2, and WDB3) indicates that a predicted wind condition of PWDA may correspond with an actual wind condition at the planned altitude 512A, the first balloon 404A may select the planned altitude 512A as the second planned altitude 704A. As another example, when any or all of the wind data WDA1, WDA2, and WDA3 and/or WDB1, WDB2, and WB3 indicates that a predicted wind condition of PWDA may not correspond with an actual wind condition at the planned altitude 512A, the first balloon 404A may select the first altitude 516A1, the second altitude 516A2, or the third altitude 516A3 as the second planned altitude 704A.

Further in some implementations, the first balloon 404A may determine the second planned altitude 704A by selecting a particular altitude among the first one or more altitudes 516A based at least in part on a desired wind condition at the particular altitude. As examples, the desired wind condition may be a maximum wind speed, a minimum wind speed, a desired wind speed for a movement of the first balloon 404A between the maximum wind speed and the minimum wind speed, and/or a desired wind direction for a movement of the first balloon 404A. The movement of the first balloon 404A and/or the movement of the second balloon 404B may be based on one or more of: a desired displacement, a desired horizontal movement, a desired change in altitude, a desired velocity, a desired change in velocity, and a desired acceleration.

As another example, the first balloon 404A may determine the second planned altitude 704A the same or similar way as the fleet planner 402 may determine the second planned altitude 604A in example 600.

In addition, the first balloon 404A may receive wind data at the second planned altitude 704A, the first balloon 404A may transmit the wind data received at the second planned altitude 704A to the fleet planner 402, the fleet planner 402 may receive the wind data from the first balloon 404A, and/or the fleet planner 402 may update the wind model based at least in part on the received wind data. The first balloon 404A may receive wind data at the second planned altitude 704A, the first balloon 404A may transmit the wind data received at the second planned altitude 704A to the fleet planner 402, the fleet planner 402 may receive the wind data from the first balloon 404A, and/or the fleet planner 402 may update the wind model based at least in part on the received wind data like the first balloon 404A may receive wind data at the second planned altitude 604A, the first balloon 404A may transmit the wind data received at the second planned altitude 604A to the fleet planner 402, the fleet planner 402 may receive the wind data from the first balloon 404A, and/or the fleet planner 402 may update the wind model based at least in part on the received wind data at point 602A in example 600 as described with reference to FIG. 6.

Moreover, at point 702B, the fleet planner 402 may send one or more instructions to the second balloon 404B to implement its respectively-determined flight plan, and the one or more instructions may indicate to determine the second planned altitude 704B and navigate to the second planned altitude 704B using any or all of the communication techniques that a balloon may use to communicate with another balloon and/or a ground-based station as described herein.

In some implementations, the second balloon 404B may determine the second planned altitude 704B based at least in part on the wind data received at the second one or more altitudes 516B and/or the wind data received at the first one or more altitudes 516A by selecting a particular altitude from the group consisting of the fourth altitude 516B1, the fifth altitude 516B2, the sixth altitude 516B3, and the planned altitude 512B. In the illustrated example, the second balloon 404B may select the fourth altitude 516B1 as the second planned altitude 704A. Accordingly, the second balloon 404B may navigate to the second planned altitude 704B at least in part by ascending to the second planned altitude 704B. However, in other examples, the second balloon 404B may select the fifth altitude 516B2, the sixth altitude 516B3, or the planned altitude 512B. And in other examples, the second balloon 404B may navigate to the second planned altitude 704B at least in part by ascending or descending to the second planned altitude 704B.

For example, when any or all of the wind data received at the second one or more altitudes 516B in example 500 (e.g., WDB1, WDB2, and WDB3) and/or the wind data received at the second one or more altitudes 516A (e.g., WDA1, WDA2, and WDA3) indicates that a predicted wind condition of PWDB may correspond with an actual wind condition at the planned altitude 512A, the second balloon 404B may select the planned altitude 512B as the second planned altitude 604B. As another example, when any or all of the wind data WDB1, WDB2, and WDB3 and/or WDA1, WDA2, and WDA3 indicates that a predicted wind condition of PWDB may not correspond with an actual wind condition at the planned altitude 512B, the second balloon 404B may select the fourth altitude 516B1, the fifth altitude 516B2, or the sixth altitude 516B3 as the second planned altitude 704B.

Further in some implementations, the second balloon 404B may determine the second planned altitude 704B by selecting a particular altitude among the second one or more altitudes 516B based at least in part on a desired wind condition at the particular altitude. As examples, the desired wind condition may be a maximum wind speed, a minimum wind speed, a desired wind speed for a movement of the second balloon 404B between the maximum wind speed and the minimum wind speed, and/or a desired wind direction for a movement of the second balloon 404B.

As another example, the second balloon 404B may determine the second planned altitude 704B the same or similar way as the fleet planner 402 may determine the second planned altitude 604B in example 600.

In addition, the second balloon 404B may receive wind data at the second planned altitude 704B, the second balloon 404B may transmit the wind data received at the second planned altitude 704B to the fleet planner 402, the fleet planner 402 may receive the wind data from the second balloon 404B, and/or the fleet planner 402 may update the wind model based at least in part on the received wind data. The second balloon 404B may receive wind data at the second planned altitude 704B, the second balloon 404B may transmit the wind data received at the second planned altitude 704B to the fleet planner 402, the fleet planner 402 may receive the wind data from the second balloon 404B, and/or the fleet planner 402 may update the wind model based at least in part on the received wind data like the second balloon 404B may receive wind data at the second planned altitude 604B, the second balloon 404B may transmit the wind data received at the second planned altitude 604B to the fleet planner 402, the fleet planner 402 may receive the wind data from the second balloon 404B, and/or the fleet planner 402 may update the wind model based at least in part on the received wind data at point 602B in example 600 as described with reference to FIG. 6.

In a further respect, one or more actions of example 600 and one or more actions of example 700 may be performed concurrently. For example, the fleet planner 402 may determine the second planned altitude 604A for the first balloon 404A and the fleet planner 402 may send second one or more instructions to the first balloon 404A, and the one or more instructions may indicate to navigate to the second planned altitude 604A; and the fleet planner 402 may send one or more instructions to the second balloon 404B to implement its respectively-determined flight plan, and the one or more instructions may indicate to determine the second planned altitude 704B based at least in part on the wind data received at the second one or more altitudes 516B and/or the wind data received at the first one or more altitudes 516A and navigating to the second planned altitude 704B.

As another example, the fleet planner 402 may send one or more instructions to the first balloon 404A to implement its respectively-determined flight plan, and the one or more instructions may indicate to determine the second planned altitude 704A based at least in part on the wind data received at the first one or more altitudes 516A and/or the wind data received at the second one or more altitudes 516B and navigate to the second planned altitude 704A; and the fleet planner 402 may determine the second planned altitude 604B for the second balloon 404B and the fleet planner 402 may send second one or more instructions to the second balloon 404B to navigate to the second planned altitude 604B.

V. Illustrative Methods

Figure 8:
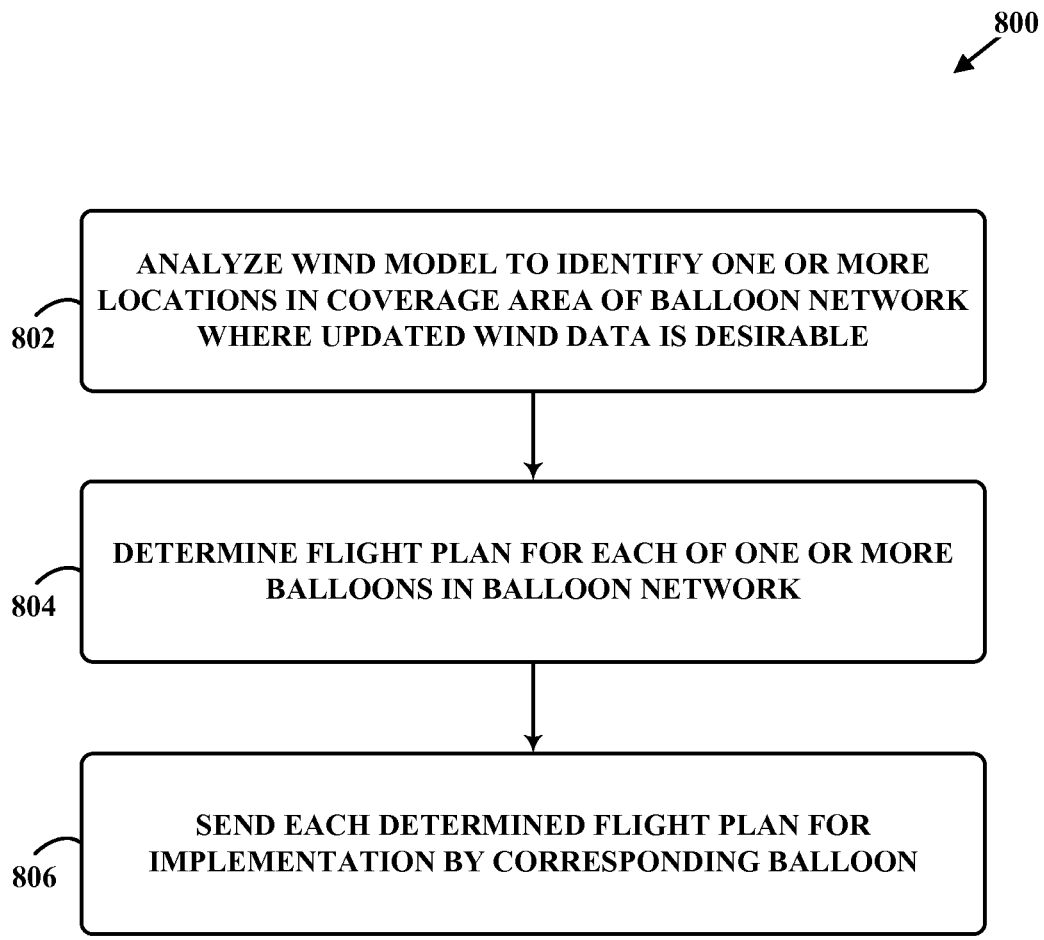
FIG. 8 is a flowchart illustrating a method, according to an example embodiment.

FIG. 8 is a flowchart illustrating a method 800, according to an example embodiment. Illustrative methods, such as method 800, may be carried out in whole or in part by a fleet planner, a balloon, and/or a ground-based station, such as by the one or more components of the fleet planner 402 shown in FIG. 4, the balloon 300 shown in FIG. 3, the ground-based station 106 and the ground-based station 112 shown in FIG. 1, and/or the central control system 200, the regional control system 202A, the regional control system 202B, and the regional control system 202C shown in FIG. 2. For simplicity, method 800 may be described generally as being carried out by the fleet planner 402. However, it should be understood that example methods, such as method 800, may be carried out by other entities or combinations of entities without departing from the scope of the disclosure.

As shown by block 802, method 800 involves analyzing, by a computing device, a wind model to identify one or more locations in a coverage area of a balloon network where updated wind data is desirable. In some embodiments, the balloon network may include a plurality of balloons that are configured to provide data service. The computing device may analyze the wind model the same or similar way as the fleet planner 402 may analyze the wind model at point 410 as described with reference to FIG. 4.

As shown by block 804, method 800 involves determining, by the computing device, a flight plan for each of one or more balloons in the balloon network, wherein at least one flight plan is determined based at least in part on both: (a) the one or more locations where updated wind data is desirable and (b) data-service requirements in the coverage area of the balloon network. The computing device may determine the flight plan for each of the one or more balloons in the balloon network the same or similar way as the fleet planner 402 may determine the flight plan for the first balloon 404A and the flight plan for the second balloon 404B at point 412 as described with reference to FIG. 4.

As shown by block 806, method 800 involves sending each determined flight plan for implementation by the corresponding balloon. Each determined flight plan may be sent for implementation to the corresponding balloon the same or similar way as the fleet planner 402 may send each determined flight plan for implementation to the corresponding balloon at point 414 as described with reference to FIG. 4.

In some implementations, the data-service requirements may comprise one or more of data-service requirements for data-communication service, data-service requirements for on-demand imaging service, and data-service requirements for location service.

Further in some implementations, the method 800 may further involve determining data usage of the balloon network and selecting the data-service requirements among data-service requirements for data-communication, data-service requirements for on-demand imaging, and data-service requirements for location service based at least in part on the data usage of the balloon network.

Figure 9:
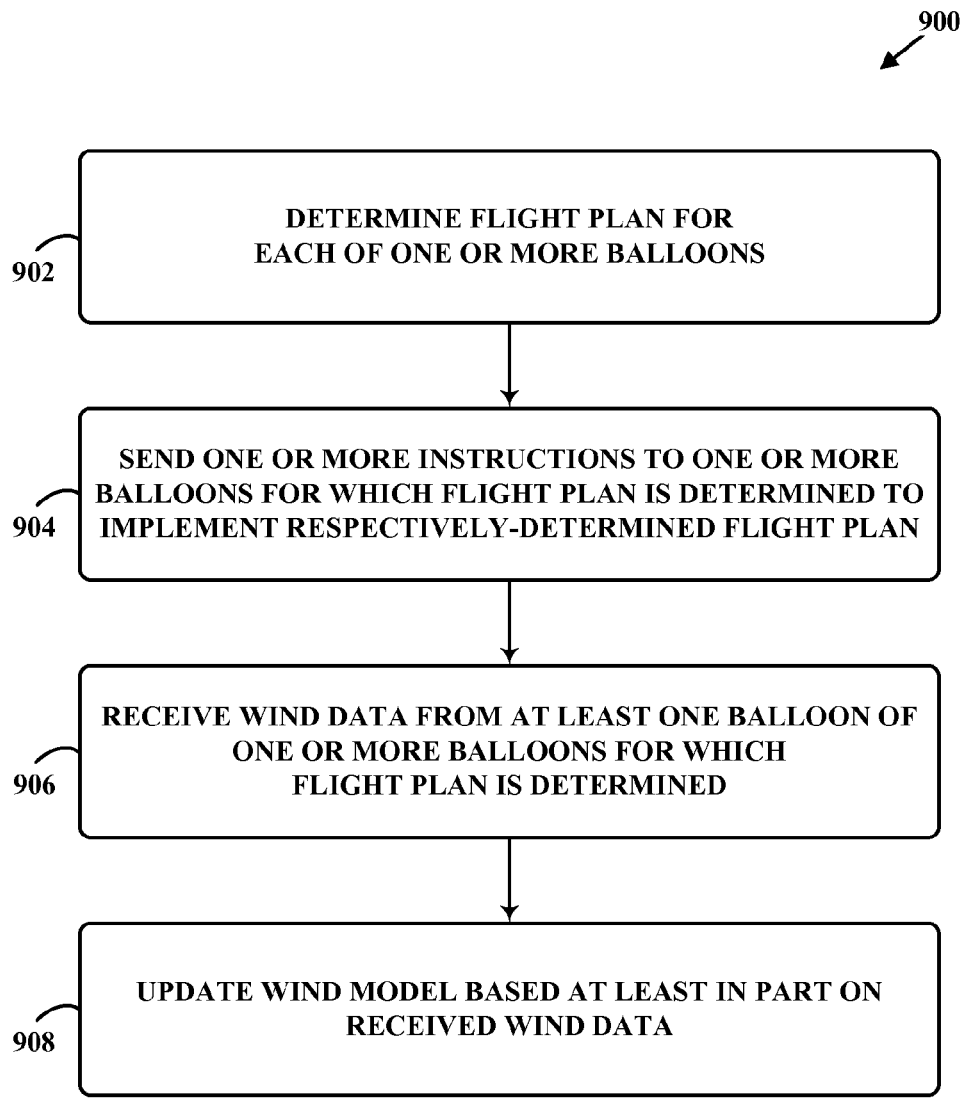
FIG. 9 is a flowchart illustrating another method, according to an example embodiment.

FIG. 9 is a flowchart illustrating a method 900, according to an example embodiment. Illustrative methods, such as method 900, may be carried out in whole or in part by a fleet planner, a balloon, and/or a ground-based station, such as by the one or more components of the fleet planner 402 shown in FIG. 4, the balloon 300 shown in FIG. 3, the ground-based station 106 and the ground-based station 112 shown in FIG. 1, and/or the central control system 200, the regional control system 202A, the regional control system 202B, and the regional control system 202C shown in FIG. 2. For simplicity, method 900 may be described generally as being carried out by the fleet planner 402. However, it should be understood that example methods, such as method 900, may be carried out by other entities or combinations of entities without departing from the scope of the disclosure.

As shown by block 902, method 900 involves determining, by a computing device, a flight plan for each of one or more balloons. In some embodiments, the one or more balloons may be operating as part of a balloon network, the balloon network may be operable for data communications, and determining the flight plan for at least one of the one or more balloons may involve determining a planned altitude based at least in part on a wind model indicating predicted wind data at a plurality of altitudes. The computing device may determine the flight plan for each of the one or more balloons the same or similar way as the fleet planner 402 may determine the flight plan for the first balloon 404A and the second balloon 404B at point 510 as described with reference to FIG. 5.

For instance, in some embodiments, the planned altitude may be determined based at least in part on acquisition of wind data for the wind model. Further, in some embodiments, the planned altitude may be determined based at least in part on a movement of the balloon for which the flight plan is determined. And in at least one such embodiment, the movement of the balloon may be based on one or more of: a desired displacement, a desired horizontal movement, a desired change in altitude, a desired velocity, a desired change in velocity, and a desired acceleration.

Moreover, in at least one such embodiment, the movement of the balloon may be based on a state of the balloon network. And in at least one such embodiment, the state of the balloon network may be based on data-communication requirements of the balloon network.

In addition, in at least one embodiment, the state of the balloon network may be based on one or more of data-service requirements for data-communication service, data-service requirements for on-demand imaging service, and data-service requirements for location service, historical bandwidth demand, and expected bandwidth demand.

Further, in some embodiments, determining, by the computing device, the flight plan for each one or more balloons may involve determining the planned altitude based at least in part on two or more wind models indicating predicted wind data at a plurality of altitudes.

As shown by block 904, method 900 involves sending, by the computing device, one or more instructions to the one or more balloons for which a flight plan is determined to implement the respectively-determined flight plan. In some embodiments, the one or more instructions to a given one of the balloons may indicate to: navigate to one or more altitudes, and receive wind data at each altitude of the one or more altitudes. Further, in some embodiments, the wind data may indicate an actual wind condition at a respective altitude of the one or more altitudes. The computing device may send one or more instructions to the one or more balloons for which a flight plan is determined to implement the respectively-determined flight plan the same or similar way as the fleet planner 402 may send one or more instructions to the first balloon 404A to implement the respectively-determined flight plan at point 514A and may send one or more instructions to the second balloon 404B to implement the respectively-determined flight plan at point 514B as described with reference to FIG. 5.

For instance, in some embodiments, the one or more altitudes may be less or greater than the planned altitude. And in at least one such embodiment, the one or more altitudes may include a first altitude and a second altitude, the first altitude may be less than the second altitude, and the second altitude may be less than the planned altitude. Moreover, in at least one such embodiment, the one or more altitudes may include a first altitude and a second altitude, the first altitude may be greater than the second altitude, and the second altitude may be greater than the planned altitude.

Moreover, in some embodiments, the one or more instructions to the given one of the balloons may further indicate to: stop at each altitude of the one or more altitudes for a predetermined period of time. Further, in some embodiments, the one or more instructions to the given one of the balloons may further indicate to: transition through the one or more altitudes without stopping at the one or more altitudes.

In addition, in some embodiments, the one or more balloons may each have an initial altitude and the one or more instructions to a given one of the balloons may indicate to: transition through one or more altitudes between the initial altitude and the planned altitude and receive wind data at each altitude of the one or more altitudes between the initial altitude and the planned altitude, wherein the wind data indicates an actual wind condition at a respective altitude of the one or more altitudes between the initial altitude and the planned altitude.

As shown by block 906, method 900 involves receiving, by the computing device, the wind data from at least one balloon of the one or more balloons for which a flight plan is implemented. The computing device may receive the wind data from at least one balloon of the one or more balloons for which a flight plan is implemented the same or similar way as the fleet planner 402 may receive wind data from the first balloon 404A and/or receive wind data from the second balloon 404B at point 518 as described with reference to FIG. 5.

As shown by block 908, method 900 involves updating, by the computing device, the wind model based at least in part on the received wind data. The computing device may update the wind model the same or similar way as the fleet planner 402 may update the wind model at point 520 as described with reference to FIG. 5.

Method 900 may further involve updating, by the computing device, at least one flight plan based at least in part on the received wind data. The computing device may update the at least one flight plan based at least in part on the received wind data the same or similar way as the fleet planner 402 may update the flight plan for the first balloon 404A at point 602A and/or update the flight plan for the second balloon 404B at point 602B as described with reference to FIG. 6.

For instance, in some embodiments, updating, by the computing device, the at least one flight plan based at least in part on the received wind data may involve determining, by the computing device, a second planned altitude, and sending, by the computing device, second one or more instructions to the balloon for which the flight plan is updated. In some embodiments, the second one or more instructions to the balloon for which the flight plan is updated may indicate to navigate to the second planned altitude. The second planned altitude may take the form of or be similar in form to the second planned altitude 604A and/or the second planned altitude 604B.

Moreover, in at least one embodiment, the second planned altitude may be determined based at least in part on acquisition of wind data for the wind model. Further, in some embodiments, the second planned altitude may be determined based at least in part on a movement of the balloon for which the flight plan is determined. And in at least one such embodiment, the movement of the balloon may be based on one or more of: a desired displacement, a desired horizontal movement, a desired change in altitude, a desired velocity, a desired change in velocity, and a desired acceleration.

Further, in at least one such embodiment, the movement of the balloon may be based on a state of the balloon network. And in at least one such embodiment, the state of the balloon network may be based on data-communication requirements of the balloon network.

Further still, in at least one embodiment, the second planned altitude may be different than the one or more altitudes and the planned altitude. Moreover, in at least one embodiment, the second planned altitude may be substantially the same as one or more altitudes or the planned altitude.

In addition, at block 904, the one or more instructions to the given one of the balloons may further indicate to: determine a second planned altitude based at least in part on the received wind data, and navigate to the second planned altitude.

The given one of the balloons may determine the second planned altitude based at least in part on the received wind data the same or similar way as the first balloon 404A may determine the second planned altitude 704A based at least in part on the received wind data at point 702A and/or second balloon 404B may determine the second planned altitude 704B based at least in part on the received wind data at point 702B as described with reference to FIG. 7. And the second planned altitude may take the form of or be similar the second planned 704A and/or the second planned 704B.

For instance, in some embodiments, determining the second planned altitude based at least in part on the received wind data may involve selecting a particular altitude from the group consisting of a particular altitude of the one or more altitudes and the planned altitude.

Moreover, in some embodiments, determining the second planned altitude based at least in part on the received wind data may involve selecting a particular altitude among the one or more altitudes based at least in part on a desired wind condition at the particular altitude. As examples, the desired wind condition may be a maximum wind speed, a minimum wind speed, a desired wind speed for a movement of the given on of the balloons between the maximum wind speed and the minimum wind speed, and/or a desired wind direction for a movement of the given one of the balloons.

Further, the given one of the balloons may navigate to the second planned altitude the same or similar way as the first balloon 404A may navigate to the second planned altitude 704A at point 702A and/or the second balloon 404B may navigate to the second planned altitude 704B at point 702B as described with reference to FIG. 7.

VI. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
analyzing, by a computing device, a wind model to identify one or more locations in a coverage area of a balloon network where updated wind data is desirable, wherein the balloon network comprises a plurality of balloons that are configured to provide data service, and wherein the one or more locations where updated wind data is desirable comprises one or more locations where existing wind data is incomplete, inaccurate, or out of date;
determining, by the computing device, a flight plan for each of one or more balloons in the balloon network, wherein each flight plan comprises a planned altitude, and wherein at least one flight plan is determined based at least in part on both: (a) the one or more locations where updated wind data is desirable and (b) data-service requirements in the coverage area of the balloon network; and
sending each determined flight plan for implementation by the corresponding balloon, wherein sending each determined flight plan comprises sending one or more instructions to the corresponding balloon that indicate to: (a) navigate to the corresponding planned altitude and (b) receive wind data at the corresponding planned altitude, and wherein the wind data indicates an actual wind condition at the corresponding planned altitude.

2. The method of claim 1, wherein the data-service requirements comprises one or more of data-service requirements for data-communication service, data-service requirements for on-demand imaging service, and data-service requirements for location service.

3. The method of claim 1, further comprising:
determining data usage of the balloon network; and
selecting the data-service requirements among data-service requirements for data-communication, data-service requirements for on-demand imaging, and data-service requirements for location service based at least in part on the data usage of the balloon network.

4. A method comprising:
determining, by a computing device, a flight plan for each of one or more balloons, wherein the one or more balloons are operating as part of a balloon network, wherein the balloon network is operable for data communications, and wherein determining the flight plan for at least one of the one or more balloons comprises determining a planned altitude based at least in part on a wind model indicating predicted wind data at a plurality of altitudes and acquisition of wind data for the wind model;
sending, by the computing device, one or more instructions to the one or more balloons for which a flight plan is determined to implement the respectively-determined flight plan, wherein the one or more instructions to a given one of the balloons indicate to:
navigate to one or more altitudes, wherein the one or more altitudes is less or greater than the planned altitude; and
receive wind data at each altitude of the one or more altitudes, wherein the wind data indicates an actual wind condition at a respective altitude of the one or more altitudes;
receiving, by the computing device, the wind data from at least one balloon of the one or more balloons for which a flight plan is implemented; and
updating, by the computing device, the wind model based at least in part on the received wind data.

5. The method of claim 4, wherein the one or more instructions to the given one of the balloons further indicates to: stop at each altitude of the one or more altitudes for a predetermined time period.

6. The method of claim 4, wherein the one or more instructions to the given one of the balloons further indicates to: transition through the one or more altitudes without stopping at the one or more altitudes.

7. The method of claim 4, wherein determining, by the computing device, the flight plan for each of one or more balloons comprises determining the planned altitude based at least in part on two or more wind models indicating predicted wind data at a plurality of altitudes.

8. The method of claim 4, wherein the planned altitude is determined based at least in part on a movement of the balloon for which the flight plan is determined.

9. The method of claim 8, wherein the movement of the balloon is based on one or more of: a desired displacement, a desired horizontal movement, a desired change in altitude, a desired velocity, a desired change in velocity, and a desired acceleration.

10. The method of claim 8, wherein the movement of the balloon is based on a state of the balloon network.

11. The method of claim 10, wherein the state of the balloon network is based on data-communication requirements of the balloon network.

12. The method of claim 4, wherein the one or more altitudes comprises a first altitude and a second altitude, wherein the first altitude is less than the second altitude, and wherein the second altitude is less than the planned altitude.

13. The method of claim 4, wherein the one or more altitudes comprises a first altitude and a second altitude, wherein the first altitude is greater than the second altitude, and the second altitude is greater than the planned altitude.

14. The method of claim 4, further comprising updating, by the computing device, at least one flight plan based at least in part on the received wind data.

15. The method of claim 14, wherein updating, by the computing device, the at least one flight plan based at least in part on the received wind data comprises:
determining, by the computing device, a second planned altitude; and
sending, by the computing device, second one or more instructions to the balloon for which the flight plan is updated, wherein the second one or more instructions to the balloon for which the flight plan is updated indicate to navigate to the second planned altitude.

16. The method of claim 15, wherein the second planned altitude is determined based at least in part on acquisition of wind data for the wind model.

17. The method of claim 4, wherein the one or more instructions to the given one of the balloons further indicates to:
determine a second planned altitude based at least in part on the received wind data; and
navigate to the second planned altitude.

18. The method of claim 17, wherein determine the second planned altitude based at least in part on the received wind data comprises selecting a particular altitude from the group consisting of a particular altitude of the one or more altitudes and the planned altitude.

19. The method of claim 4, further comprising determining, by the computing device, a number of altitudes of the one or more altitudes or a distance between each altitude of the one or more altitudes.

20. A non-transitory computer readable medium having stored therein instructions executable by a computing device to cause the computing device to perform functions, the functions comprising:
determining a flight plan for each of one or more balloons, wherein the one or more balloons are operating as part of a balloon network, wherein the balloon network is operable for data communications, and wherein determining the flight plan for at least one of the one or more balloons comprises determining a planned altitude based at least in part on a wind model indicating predicted wind data at a plurality of altitudes and acquisition of wind data for the wind model;
sending instructions to the one or more balloons for which a flight plan is determined to implement the respectively-determined flight plan, wherein the instructions to a given one of the balloons indicate to:
navigate to one or more altitudes, wherein the one or more altitudes is less or greater than the planned altitude; and
receive wind data at each altitude of the one or more altitudes, wherein the wind data indicates an actual wind condition at a respective altitude of the one or more altitudes;
receiving the wind data from at least one balloon of the one or more balloons for which a flight plan is implemented; and
updating the wind model based at least in part on the received wind data.

21. The non-transitory computer-readable medium of claim 20, wherein the functions further comprise determining a number of altitudes of the one or more altitudes or a distance between each altitude of the one or more altitudes.

22. A non-transitory computer readable medium having stored therein instructions executable by a computing device to cause the computing device to perform functions, the functions comprising:

analyzing a wind model to identify one or more locations in a coverage area of a balloon network where updated wind data is desirable, wherein the balloon network comprises a plurality of balloons that are configured to provide data service, and wherein the one or more locations where updated wind data is desirable comprises one or more locations where existing wind data is incomplete, inaccurate, or out of date;

determining a flight plan for each of the one or more balloons in the balloon network, wherein each flight plan comprises a planned altitude, and wherein at least one flight plan is determined based at least in part on both: (a) the one or more locations where updated wind data is desirable and (b) data-service requirements in the coverage area of the balloon network; and sending each determined flight plan for implementation by the corresponding balloon, wherein sending each determined flight plan comprises sending one or more instructions to the corresponding balloon that indicate to: (a) navigate to the corresponding planned altitude and (b) receive wind data at the corresponding planned altitude, and wherein the wind data indicates an actual wind condition at the corresponding planned altitude.

* * * * *